US012204747B2

(12) United States Patent
Ording et al.

(10) Patent No.: US 12,204,747 B2
(45) Date of Patent: *Jan. 21, 2025

(54) PORTABLE ELECTRONIC DEVICE PERFORMING WINDOW OPERATIONS WITH GESTURES ON A TOUCHSCREEN

(71) Applicant: Apple Inc., Cupertino, CA (US)

(72) Inventors: Bas Ording, San Francisco, CA (US); Scott M. Herz, San Jose, CA (US); Wayne C. Westerman, Burlingame, CA (US); Scott Forstall, Los Altos, CA (US); Gregory N. Christie, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,621

(22) Filed: Nov. 29, 2023

(65) Prior Publication Data

US 2024/0094899 A1    Mar. 21, 2024

Related U.S. Application Data

(63) Continuation of application No. 17/970,453, filed on Oct. 20, 2022, now abandoned, which is a (Continued)

(51) Int. Cl.
*G06F 3/048* (2013.01)
*G06F 3/041* (2006.01)
(Continued)

(52) U.S. Cl.
CPC ........ *G06F 3/04883* (2013.01); *G06F 3/0412* (2013.01); *G06F 3/04817* (2013.01); (Continued)

(58) Field of Classification Search
CPC .. G06F 3/0482; G06F 3/04845; G06F 3/0485; G06F 3/04883
See application file for complete search history.

(56) References Cited

U.S. PATENT DOCUMENTS 5,347,295 A    9/1994 Agulnick et al.
5,559,301 A    9/1996 Bryan, Jr. et al.
(Continued)

FOREIGN PATENT DOCUMENTS

CN    1203679 A    12/1998
CN    1278340 A    12/2000
(Continued)

OTHER PUBLICATIONS

Agarwal Amit, "iTunesInlineVideo", Digital Inspiration—The Tech Guide, available online at <http://labnol.blogspot.com/2006_09_17_labnol_archive.html>, 2006, 27 pages.
(Continued)

*Primary Examiner* — Liliana Cerullo
(74) *Attorney, Agent, or Firm* — DLA Piper LLP (US)

(57) ABSTRACT

A portable electronic device with a touch-sensitive display is disclosed. One aspect of the invention involves a computer-implemented method in which the portable electronic device: displays an application on the touch-sensitive display; and when the application is in a predefined mode, performs a predefined operation in response to each gesture of a set of multiple distinct gestures on the touch-sensitive display. Another aspect of the invention involves a computer-implemented method in which the portable electronic device: displays a first application; when the first application is in a first mode, performs a first operation upon detecting a first gesture on the touch-sensitive display; and performs
(Continued)

the first operation upon detecting a second gesture on the touch-sensitive display, wherein the second gesture is different from the first gesture.

15 Claims, 12 Drawing Sheets

Related U.S. Application Data continuation of application No. 17/098,672, filed on Nov. 16, 2020, now Pat. No. 11,481,112, which is a continuation of application No. 16/288,632, filed on Feb. 28, 2019, now Pat. No. 10,838,617, which is a continuation of application No. 15/807,283, filed on Nov. 8, 2017, now Pat. No. 10,222,977, which is a continuation of application No. 14/493,128, filed on Sep. 22, 2014, now Pat. No. 9,927,970, which is a continuation of application No. 11/850,638, filed on Sep. 5, 2007, now Pat. No. 8,842,074.

(60) Provisional application No. 60/937,993, filed on Jun. 29, 2007, provisional application No. 60/879,469, filed on Jan. 8, 2007, provisional application No. 60/883,817, filed on Jan. 7, 2007, provisional application No. 60/879,253, filed on Jan. 7, 2007, provisional application No. 60/824,769, filed on Sep. 6, 2006.

(51) Int. Cl.
*G06F 3/04817* (2022.01)
*G06F 3/0482* (2013.01)
*G06F 3/04845* (2022.01)
*G06F 3/0485* (2022.01)
*G06F 3/04883* (2022.01)
*H04M 1/72403* (2021.01)

(52) U.S. Cl.
CPC ........ *G06F 3/0482* (2013.01); *G06F 3/04845* (2013.01); *G06F 3/0485* (2013.01); *H04M 1/72403* (2021.01); *G06F 3/0416* (2013.01)

(56) References Cited

U.S. PATENT DOCUMENTS

| | | |
|---|---|---|
| 5,610,653 A | 3/1997 | Abecassis |
| 5,612,719 A | 3/1997 | Beernink et al. |
| 5,739,821 A | 4/1998 | Ho et al. |
| 5,760,773 A | 6/1998 | Berman et al. |
| 5,828,370 A | 10/1998 | Demoney et al. |
| 5,880,733 A * | 3/1999 | Horvitz .................. G06F 9/451 715/978 |
| 6,025,842 A | 2/2000 | Filetto et al. |
| 6,040,824 A | 3/2000 | Maekawa et al. |
| 6,069,606 A | 5/2000 | Sciammarella et al. |
| 6,073,036 A | 6/2000 | Heikkinen et al. |
| 6,133,916 A | 10/2000 | Bukszar et al. |
| 6,177,936 B1 | 1/2001 | Cragun |
| 6,199,082 B1 | 3/2001 | Ferrel et al. |
| 6,243,080 B1 | 6/2001 | Molne |
| 6,262,732 B1 | 7/2001 | Coleman et al. |
| 6,297,795 B1 | 10/2001 | Kato et al. |
| 6,313,855 B1 | 11/2001 | Shuping et al. |
| 6,326,970 B1 | 12/2001 | Mott et al. |
| 6,349,410 B1 | 2/2002 | Lortz |
| 6,359,615 B1 | 3/2002 | Singh |
| 6,411,283 B1 | 6/2002 | Murphy |
| 6,466,198 B1 | 10/2002 | Feinstein |
| 6,466,203 B2 | 10/2002 | Van Ee |
| 6,486,895 B1 | 11/2002 | Robertson et al. |
| 6,489,975 B1 | 12/2002 | Patil et al. |
| 6,496,182 B1 | 12/2002 | Wong et al. |
| 6,570,583 B1 | 5/2003 | Kung et al. |
| 6,590,568 B1 | 7/2003 | Astala et al. |
| 6,613,100 B2 | 9/2003 | Miller |
| 6,639,584 B1 | 10/2003 | Li |
| 6,683,628 B1 | 1/2004 | Nakagawa et al. |
| 6,724,403 B1 | 4/2004 | Santoro et al. |
| 6,771,250 B1 | 8/2004 | Oh |
| 6,847,778 B1 | 1/2005 | Mckendrick et al. |
| 6,928,461 B2 | 8/2005 | Tuli |
| 6,956,564 B1 | 10/2005 | Williams |
| 6,966,837 B1 | 11/2005 | Best |
| 7,030,861 B1 | 4/2006 | Westerman et al. |
| 7,054,965 B2 | 5/2006 | Bell et al. |
| 7,075,512 B1 | 7/2006 | Fabre et al. |
| 7,085,590 B2 | 8/2006 | Kennedy et al. |
| 7,149,549 B1 | 12/2006 | Ortiz et al. |
| 7,152,210 B1 | 12/2006 | Van Den Hoven et al. |
| 7,166,791 B2 | 1/2007 | Robbin et al. |
| 7,171,625 B1 | 1/2007 | Sacchi |
| 7,346,855 B2 | 3/2008 | Hellyar et al. |
| 7,461,353 B2 | 12/2008 | Rohrabaugh et al. |
| 7,479,949 B2 | 1/2009 | Jobs et al. |
| 7,480,870 B2 | 1/2009 | Anzures et al. |
| 7,509,588 B2 | 3/2009 | Van Os et al. |
| 7,587,671 B2 | 9/2009 | Saft et al. |
| 7,596,761 B2 | 9/2009 | Lemay et al. |
| 7,676,767 B2 | 3/2010 | Hofmeister et al. |
| 7,730,401 B2 | 6/2010 | Gillespie et al. |
| 7,739,271 B2 | 6/2010 | Cook et al. |
| 7,788,583 B1 | 8/2010 | Amzallag et al. |
| 7,831,926 B2 | 11/2010 | Rohrabaugh et al. |
| 7,844,889 B2 | 11/2010 | Rohrabaugh et al. |
| 7,864,163 B2 | 1/2011 | Ording et al. |
| 7,956,849 B2 | 6/2011 | Anzures et al. |
| 8,214,768 B2 | 7/2012 | Boule et al. |
| 8,531,423 B2 | 9/2013 | Anzures et al. |
| 8,547,355 B2 | 10/2013 | Anzures et al. |
| 8,669,950 B2 | 3/2014 | Forstall et al. |
| 8,842,074 B2 | 9/2014 | Forstall et al. |
| 8,912,988 B2 | 12/2014 | Tomida et al. |
| 9,927,970 B2 | 3/2018 | Ording et al. |
| 10,228,815 B2 | 3/2019 | Forstall et al. |
| 10,838,617 B2 | 11/2020 | Ording et al. |
| 11,029,838 B2 * | 6/2021 | LeMay ............... G06F 3/04886 |
| 2001/0024195 A1 | 9/2001 | Hayakawa |
| 2002/0015064 A1 | 2/2002 | Robotham et al. |
| 2002/0033848 A1 | 3/2002 | Sciammarella et al. |
| 2002/0093531 A1 | 7/2002 | Barile |
| 2002/0152283 A1 | 10/2002 | Dutta et al. |
| 2002/0163545 A1 | 11/2002 | Hii |
| 2002/0191029 A1 | 12/2002 | Gillespie et al. |
| 2003/0013483 A1 | 1/2003 | Ausems et al. |
| 2003/0025676 A1 | 2/2003 | Cappendijk |
| 2003/0033331 A1 | 2/2003 | Sena et al. |
| 2003/0063125 A1 | 4/2003 | Miyajima et al. |
| 2003/0076301 A1 | 4/2003 | Tsuk et al. |
| 2003/0076303 A1 | 4/2003 | Huppi |
| 2003/0081135 A1 | 5/2003 | Boll |
| 2003/0095096 A1 | 5/2003 | Robbin et al. |
| 2003/0095135 A1 | 5/2003 | Kaasila et al. |
| 2003/0095155 A1 | 5/2003 | Johnson |
| 2003/0117427 A1 | 6/2003 | Haughawout et al. |
| 2003/0117440 A1 | 6/2003 | Hellyar et al. |
| 2003/0128228 A1 * | 7/2003 | Crow .................... G11B 20/10 715/716 |
| 2003/0135649 A1 | 7/2003 | Buckley et al. |
| 2003/0164861 A1 | 9/2003 | Barbanson et al. |
| 2003/0193524 A1 | 10/2003 | Bates et al. |
| 2004/0049541 A1 | 3/2004 | Swahn et al. |
| 2004/0085351 A1 | 5/2004 | Tokkonen |
| 2004/0100479 A1 | 5/2004 | Nakano et al. |
| 2004/0103371 A1 | 5/2004 | Chen et al. |
| 2004/0125081 A1 | 7/2004 | Hayakawa |
| 2004/0143796 A1 | 7/2004 | Lerner et al. |
| 2004/0167783 A1 | 8/2004 | Nagai |
| 2004/0169674 A1 | 9/2004 | Linjama |
| 2004/0201595 A1 | 10/2004 | Manchester |
| 2004/0205496 A1 | 10/2004 | Dutta et al. |

(56) References Cited

U.S. PATENT DOCUMENTS

| | | |
|---|---|---|
| 2004/0215719 A1 | 10/2004 | Altshuler |
| 2004/0268393 A1 | 12/2004 | Hunleth et al. |
| 2004/0268400 A1 | 12/2004 | Barde et al. |
| 2005/0005246 A1 | 1/2005 | Card et al. |
| 2005/0012723 A1 | 1/2005 | Pallakoff |
| 2005/0020317 A1 | 1/2005 | Koyama |
| 2005/0044509 A1 | 2/2005 | Hunleth et al. |
| 2005/0057524 A1 | 3/2005 | Hill et al. |
| 2005/0066286 A1 | 3/2005 | Makela |
| 2005/0071364 A1 | 3/2005 | Xie et al. |
| 2005/0071736 A1 | 3/2005 | Schneider et al. |
| 2005/0071778 A1 | 3/2005 | Tokkonen |
| 2005/0079896 A1 | 4/2005 | Kokko et al. |
| 2005/0093826 A1 | 5/2005 | Huh |
| 2005/0097444 A1 | 5/2005 | Ivarsey et al. |
| 2005/0114788 A1 | 5/2005 | Fabritius |
| 2005/0166232 A1 | 7/2005 | Lamkin et al. |
| 2005/0177783 A1 | 8/2005 | Agrawala et al. |
| 2005/0183017 A1 | 8/2005 | Cain |
| 2005/0192924 A1 | 9/2005 | Drucker et al. |
| 2005/0204385 A1 | 9/2005 | Sull et al. |
| 2005/0229118 A1 | 10/2005 | Chiu et al. |
| 2005/0283739 A1 | 12/2005 | Mohr et al. |
| 2005/0285880 A1 | 12/2005 | Lai et al. |
| 2006/0017692 A1 | 1/2006 | Wehrenberg et al. |
| 2006/0026521 A1 | 2/2006 | Hotelling et al. |
| 2006/0026535 A1 | 2/2006 | Hotelling et al. |
| 2006/0033761 A1 | 2/2006 | Suen et al. |
| 2006/0036944 A1 | 2/2006 | Wilson |
| 2006/0048076 A1 | 3/2006 | Vronay et al. |
| 2006/0053387 A1 | 3/2006 | Ording |
| 2006/0064647 A1 | 3/2006 | Tapuska et al. |
| 2006/0085743 A1 | 4/2006 | Baudisch et al. |
| 2006/0097991 A1 | 5/2006 | Hotelling et al. |
| 2006/0101354 A1 | 5/2006 | Hashimoto et al. |
| 2006/0123353 A1* | 6/2006 | Matthews ............. G06F 3/0481 715/779 |
| 2006/0123360 A1 | 6/2006 | Anwar et al. |
| 2006/0125799 A1 | 6/2006 | Hillis et al. |
| 2006/0143574 A1 | 6/2006 | Ito et al. |
| 2006/0146016 A1 | 7/2006 | Chan et al. |
| 2006/0146038 A1 | 7/2006 | Park et al. |
| 2006/0164382 A1 | 7/2006 | Kulas et al. |
| 2006/0197753 A1 | 9/2006 | Hotelling |
| 2006/0265643 A1 | 11/2006 | Saft et al. |
| 2006/0267995 A1 | 11/2006 | Radloff et al. |
| 2006/0277588 A1 | 12/2006 | Harrington et al. |
| 2006/0284852 A1 | 12/2006 | Hofmeister et al. |
| 2007/0004451 A1 | 1/2007 | Anderson |
| 2007/0024646 A1 | 2/2007 | Saarinen et al. |
| 2007/0038612 A1 | 2/2007 | Sull et al. |
| 2007/0067738 A1 | 3/2007 | Flynt et al. |
| 2007/0106952 A1 | 5/2007 | Matas et al. |
| 2007/0152984 A1 | 7/2007 | Ording et al. |
| 2007/0155434 A1 | 7/2007 | Jobs et al. |
| 2007/0157228 A1 | 7/2007 | Bayer et al. |
| 2007/0250768 A1 | 10/2007 | Funakami et al. |
| 2007/0263176 A1 | 11/2007 | Nozaki et al. |
| 2008/0034029 A1 | 2/2008 | Fang et al. |
| 2008/0042984 A1 | 2/2008 | Lim et al. |
| 2008/0055272 A1 | 3/2008 | Anzures et al. |
| 2008/0062137 A1 | 3/2008 | Brodersen et al. |
| 2008/0122796 A1 | 5/2008 | Jobs et al. |
| 2008/0165148 A1 | 7/2008 | Williamson et al. |
| 2008/0165152 A1 | 7/2008 | Forstall et al. |
| 2008/0165153 A1 | 7/2008 | Platzer et al. |
| 2008/0174570 A1 | 7/2008 | Jobs et al. |
| 2008/0231610 A1 | 9/2008 | Hotelling et al. |
| 2014/0059434 A1 | 2/2014 | Anzures et al. |
| 2014/0092125 A1 | 4/2014 | Max et al. |
| 2015/0046849 A1 | 2/2015 | Forstall et al. |
| 2015/0082240 A1 | 3/2015 | Herz et al. |
| 2018/0067643 A1 | 3/2018 | Ording et al. |
| 2019/0196709 A1 | 6/2019 | Ording et al. |
| 2021/0389871 A1 | 12/2021 | Ording et al. |
| 2023/0056879 A1 | 2/2023 | Ording et al. |

FOREIGN PATENT DOCUMENTS

| | | |
|---|---|---|
| CN | 1553367 A | 12/2004 |
| CN | 1613105 A | 5/2005 |
| CN | 1658137 A | 8/2005 |
| CN | 1752979 A | 3/2006 |
| EP | 476972 A2 | 3/1992 |
| EP | 651544 A2 | 5/1995 |
| EP | 0701220 A1 | 3/1996 |
| EP | 880090 A2 | 11/1998 |
| EP | 990202 A1 | 4/2000 |
| EP | 1049305 A1 | 11/2000 |
| EP | 1255186 A2 | 11/2002 |
| EP | 1517228 A2 | 3/2005 |
| EP | 1564632 A2 | 8/2005 |
| EP | 1632874 A2 | 3/2006 |
| EP | 1640878 A1 | 3/2006 |
| EP | 1752880 A1 | 2/2007 |
| FR | 2830093 A3 | 3/2003 |
| GB | 2301217 A | 11/1996 |
| JP | 6-95794 A | 4/1994 |
| JP | 7-225829 A | 8/1995 |
| JP | 8-44253 A | 2/1996 |
| JP | 9-138745 A | 5/1997 |
| JP | 10-96648 A | 4/1998 |
| JP | 10-198517 A | 7/1998 |
| JP | 11-143604 A | 5/1999 |
| JP | 11-242539 A | 9/1999 |
| JP | 2000-56889 A | 2/2000 |
| JP | 2000-163444 A | 6/2000 |
| JP | 2000-181436 A | 6/2000 |
| JP | 2000-242390 A | 9/2000 |
| JP | 2001-14133 A | 1/2001 |
| JP | 2001-142604 A | 5/2001 |
| JP | 2001-175386 A | 6/2001 |
| JP | 2001-516914 A | 10/2001 |
| JP | 2002-244635 A | 8/2002 |
| JP | 2002-259001 A | 9/2002 |
| JP | 2002-323850 A | 11/2002 |
| JP | 2003-512676 A | 4/2003 |
| JP | 2003-195997 A | 7/2003 |
| JP | 2004-199696 A | 7/2004 |
| JP | 2004-206230 A | 7/2004 |
| JP | 2004-288208 A | 10/2004 |
| JP | 2004-318505 A | 11/2004 |
| JP | 2005-18229 A | 1/2005 |
| JP | 2005-18792 A | 1/2005 |
| JP | 2005-110286 A | 4/2005 |
| JP | 2005-234291 A | 9/2005 |
| JP | 2005-242669 A | 9/2005 |
| JP | 2005-267049 A | 9/2005 |
| JP | 2006-18645 A | 1/2006 |
| JP | 2008-508600 A | 3/2008 |
| JP | 2008-518330 A | 5/2008 |
| JP | 2013-222229 A | 10/2013 |
| JP | 2014-71514 A | 4/2014 |
| KR | 1998-032331 A | 7/1998 |
| KR | 10-2004-0095410 A | 11/2004 |
| KR | 10-2006-0031600 A | 4/2006 |
| KR | 10-2006-0091321 A | 8/2006 |
| WO | 1997/20274 A1 | 6/1997 |
| WO | 1999/14655 A1 | 3/1999 |
| WO | 1999/54807 A1 | 10/1999 |
| WO | 2000/08757 A1 | 2/2000 |
| WO | 2002/46903 A1 | 6/2002 |
| WO | 2002/082418 A2 | 10/2002 |
| WO | 2002/093542 A1 | 11/2002 |
| WO | 2003/052626 A1 | 6/2003 |
| WO | 2004/021166 A1 | 3/2004 |
| WO | 2004/023450 A1 | 3/2004 |
| WO | 2004/040481 A1 | 5/2004 |
| WO | 2005/029308 A2 | 3/2005 |
| WO | 2005/036416 A2 | 4/2005 |
| WO | 2005/041020 A1 | 5/2005 |
| WO | 2005/074268 A1 | 8/2005 |

(56) References Cited

FOREIGN PATENT DOCUMENTS

| WO | 2005/106684 A1 | 11/2005 |
|---|---|---|
| WO | 2006/003591 A2 | 1/2006 |
| WO | 2006/020304 A2 | 2/2006 |
| WO | 2006/020305 A2 | 2/2006 |
| WO | 2006/042417 A1 | 4/2006 |
| WO | 2006/047697 A2 | 5/2006 |
| WO | 2007/089766 A2 | 8/2007 |
| WO | 2008/030874 A1 | 3/2008 |
| WO | 2008/030972 A1 | 3/2008 |
| WO | 2008/030976 A2 | 3/2008 |
| WO | 2008/086303 A1 | 7/2008 |

OTHER PUBLICATIONS

Ahmad et al., "Content-Based Image Retrieval on Mobile Devices", Proceedings of SPIE—IS&T Electronic Imaging, vol. 5684, 2005, pp. 255-264.
Alam et al., "Web Document Manipulation for Small Screen Devices: A Review", BCL Technologies Inc., Proceedings of the 2nd International Workshop on Web Document Analysis, 2003, pp. 33-36.
Alejandre Suzanne, "Graphing Linear Equations", Available at <http://mathforum.org/alejandre/palm/times.palm.html>, retrieved on Jun. 12, 2006, 3 pages.
Apparao et al., "Level 1 Document Object Model Specification Version 1.0)", W3C Working Draft, Available online at <http://www.w3.org/TR/WD-DOM/>, Jul. 20, 1998, 3 pages.
*Apple Inc.* vs. *Samsung Electronics Co. Ltd et al.*, Judgment in Interlocutory proceeding, Case No. 396957/KG ZA 11-730, civil law sector, Aug. 24, 2011, pp. 1-65.
*Apple Inc.* vs. *Samsung Electronics Co. Ltd., et al.*, Samsung's Motion To Supplement Invalidity Contentions, Case No. 11-cv-01846-LHK, filed Jan. 27. 2012 together with Exhibit 6, Jan. 27, 2012, 47 pages.
*Apple Inc.* vs. *Samsung Electronics Co. Ltd., et al.*, Samsung's Patent Local Rule 3-3 and 3-4 Disclosures, Case No. 11-cv-01846-LHK, dated October 7. 2011, together with Exhibits G-1 through G-7 and Exhibit H, Oct. 7, 2011, 287 pages.
Applicant-Initiated Interview Summary received for U.S. Appl. No. 16/288,632, mailed on Mar. 23, 2020, 5 pages.
Applicant-Initiated Interview Summary received for U.S. Appl. No. 17/098,672, mailed on Feb. 24, 2022, 7 pages.
Applicant-Initiated Interview Summary received for U.S. Appl. No. 17/098,672, mailed on Jun. 3, 2022, 4 pages.
Applicant-Initiated Interview Summary received for U.S. Appl. No. 17/970,453, mailed on Jul. 18, 2023, 4 pages.
Arons Barrym. , "The Audio-Graphical Interface to a Personal Integrated Telecommunications System", Thesis Submitted to the Department of Architecture at the Massachusetts Institute of Technology, Jun. 1984, 88 pages.
Baudisch et al., "Collapse-to-Zoom: Viewing Web pages, on Small Screen Devices by Interactively Removing Irrelevant Content", Microsoft Research Available at <http://www.patrickbaudisch.com/publications/2004-Baudisch-UIST04-CollapseToZoom.pdf>, Oct. 27, 2004, 4 pages.
BITSTREAM®, "Thunderhawk Pocket PC Edition for End Users", Available at <http://www.bitstream.com/wireless/products/pocketpc/faq_using.html>, retrieved on Jun. 12, 2006, 2006, 4 pages.
Björk et al., "WEST: A Web Browser for Small Terminals", Proceedings of the 12th Annual ACM Symposium on User Interface Software and Technology, Nov. 7-10, 1999, 9 pages.
Bos et al., "3 Conformance: Requirements and Recommendations", Cascading Style Sheets, level 2 CSS2 Specification, W3C Recommendation, available at <http://www.w3.org/TR/CSS21/conform.html#doctree>, May 12, 1998, 6 pages.
Buyukkokten et al., "Power Browser: Efficient Web Browsing for PDAs", Proceedings of the SIGCHI conference on Human Factors in Computing Systems. 2000, 8 pages.
Certificate of Examination received for Australian Patent Application No. 2011101190, mailed on Nov. 23, 2011, 1 page.
Chen et al., "A Novel Navigation and Transmission Technique for Mobile Handheld Devices", Technical Report CSE-2003-1, Department of Computer Science, University of California at Davis, 2003, 8 pages.
Chen et al., "Detecting Web pages. Structure for Adaptive Viewing on Small Form Factor Devices", Proceedings of the 12th international conference on World Wide Web, 2003, 9 pages.
Chen et al., "DRESS: A Slicing Tree Based Web Representation for Various Display Sizes", Microsoft Research, Technical Report, Nov. 16, 2002, 9 pages.
CNET, "Fujitsu LifeBook B6100D", Reviews, Nov. 24, 2005, 2 pages.
CNET, "Video: Create Custom Widgets with Web Clip", CNET News, Available at <http://news.cnet.com/1606-2-6103525.html>, Aug. 8, 2006, 3 pages.
Colemand Davidw., "Meridian Mail Voice Mail System Integrates Voice Processing and Personal Computing", Speech Technology, vol. 4, No. 2, Mar./Apr. 1988, pp. 84-87.
Cooper, Alan, "The Inmates Are Running the Asylum", Sams Publishing, Mar. 23, 1999, pp. 138-147.
Decision to Grant received for Chinese Patent Application No. 200780001140.9, mailed on Feb. 3, 2012, 4 pages.
Decision to Grant received for European Patent Application No. 07814690.9, mailed on Nov. 10, 2016, 3 pages.
Decision to Grant received for European Patent Application No. 078141980.1, mailed on Aug. 1, 2013, 3 pages.
Decision to Grant received for European Patent Application No. 12174677.0, mailed on Sep. 29, 2016, 3 pages.
Decision to Refusal received for European Patent Application No. 07869929.5, mailed on Jun. 4, 2012, 8 pages.
Decision to Refusal received for European Patent Application No. 09171787.6, mailed on Dec. 14, 2011, 22 pages.
Decision to Refusal received for European Patent Application No. 07814690.9, mailed on Jun. 11, 2012, 13 pages.
Decision to Refusal received for European Patent Application No. 12169786.6, mailed on Feb. 26, 2015, 16 pages.
Extended European Search Report (includes Partial European Search Report and European Search Opinion) received for European Patent Application No. 12169786.6, Jul. 11, 2012, 10 pages.
Extended European Search Report (includes Partial European Search Report and European Search Opinion) received for European Patent Application No. 09171787.6, Jan. 26, 2010, 6 pages.
Extended European Search Report received for European Patent Application No. 12174677.0, mailed on Aug. 10, 2012, 11 pages.
Eyemodule Springboard Compatible, "Turn Your Handspring™ Visor™ Handheld into a Digital Camera", User's Manual, 2000, 9 pages.
Final Office Action received for U.S. Appl. No. 11/620,647, mailed on Dec. 23, 2010, 21 pages.
Final Office Action received for U.S. Appl. No. 11/850,008, mailed on Dec. 29, 2010, 14 pages.
Final Office Action received for U.S. Appl. No. 11/850,638, mailed on Feb. 8, 2011, 14 pages.
Final Office Action received for U.S. Appl. No. 11/850,638, mailed on Feb. 4, 2014, 23 pages.
Final Office Action received for U.S. Appl. No. 11/850,638, mailed on May 15, 2012, 16 pages.
Final Office Action received for U.S. Appl. No. 11/961,773, mailed on Nov. 2, 2011, 12 pages.
Final Office Action received for U.S. Appl. No. 11/961,773, mailed on Nov. 29, 2012, 15 pages.
Final Office Action received for U.S. Appl. No. 11/968,067, mailed on May 13, 2011, 16 pages.
Final Office Action received for U.S. Appl. No. 12/042,299, mailed on Jul. 8, 2011, 8 pages.
Final Office Action received for U.S. Appl. No. 13/155,304 mailed on Feb. 7, 2011, 12 pages.
Final Office Action received for U.S. Appl. No. 14/043,788, mailed on Mar. 9, 2017, 14 pages.
Final Office Action received for U.S. Appl. No. 14/493,128, mailed on Dec. 21, 2016, 17 pages.
Final Office Action received for U.S. Appl. No. 16/288,632, mailed on Apr. 7, 2020, 6 pages.

(56) References Cited

OTHER PUBLICATIONS

Final Office Action received for U.S. Appl. No. 17/098,672, mailed on Mar. 10, 2022, 18 pages.
Final Office Action received for U.S. Appl. No. 17/970,543, mailed on Sep. 15, 2023, 17 pages.
Fingerworks Forums,"Is the Multitouch Lemur?", Available at <http://64233.167.104/search?q=cache:sjVdtyFBvRMJ:forums. finger>, retrieved on Nov. 16, 2005, Dec. 24, 2004, 2 pages.
Fingerworks, Inc., "Installation and Operation Guide for iGesture Products w/Keys", available at <www.fingerworks.com>, © 2002, 10 pages.
Fingerworks, Inc., "Installation and Operation Guide for the TouchStream and TouchStream LP", available at <www.fingerworks.com>, 2002, pp. 1-25.
Fingerworks, Inc., "Quick Reference Guide for iGesture Products", available at <www.fingerworks.com>, 1999-2002, 2 pages.
Fingerworks, Inc.,"Quick Reference Guide for TouchStream ST/LP", available at <www.fingerworks.com>, 2001-2003, 4 pages.
Fingerworks, Inc.,"TouchStream LP Silver", available at <www.fingerworks.com>, Apr. 27, 2005, 18 pages.
Fling Brian, "Designing for Mobile, Bringing Design Down to Size", Blue Flavor, Jul. 2006, 103 pages.
Gears Leigh, "Orange SPV C600 Review", Available at <http://www.coolsmartphone.com/article569.html>, retrieved on Apr. 14, 2006, 57 pages.
Getgreg, "Jeff Han's Multiple Touch Point Display, the Stuff Dreams are Made of", Available at <http://www.theyshoulddothat.com/2006/08/jeff_hans_multiple_touch_poin.html>, retrieved on Dec. 17, 2007, Aug. 16, 2006, 2 pages.
Grant of Patent reveived for Taiwan Patent Application No. 097100075, issued on Apr. 11, 2013, 3 pages.
Guan et al., "Zoom Selector: A Pen-based Interaction Technique for Small Target Selection", Transactions of the Information Processing Society of Japan, vol. 45, No. 8, Aug. 2004, pp. 2087-2097.
Han Heff, "Talks Jeff Han: Unveiling the Genius of Multi-touch Interface Design", Ted Ideas Worth Spreading, available at <http://www.ted.com/index.php/talks/view/id/65> Retrieved on Dec. 17, 2007, Aug. 2006, 2 pages.
Hart Kim, "Rewriting the Web for Mobile Phones", washingtonpost.com, available at <http://www.washingtonpost.com/wp-dyn/content/article/2007/07/25/AR2006072501517_pf.html>, Jul. 26, 2006, 2 pages.
Hinckley et al, "Input/Output Devices and Interaction Techniques", CRC Press, Nov. 2004, pp. 1-79.
Holmquist Larse., "The Zoom Browser Showing Simultaneous Detail and Overview in Large Documents", Human IT, Availbale at: <http://www.hb.se/bhs/ith/3-98/leh.htm>, 1998, 12 pages.
HTC Europe Co. Ltd and Apple Inc. invalidity Claim dated Jul. 28, 2011, together with amended Particulars of Claim and amended Grounds of Invalidity, Jul. 29, 2011, 22 pages.
HTC Europe Co. Ltd and Apple Inc. Invalidity Claim No. HC 12 C 01465, together with annexes, dated Apr. 5, 2012, 12 pages.
Intention to Grant received for European Patent Application No. 07814690.9. mailed on Jun. 28, 2016, 7 pages.
Intention to Grant received for European Patent Application No. 07841980.1, mailed on Mar. 11, 2013, 10 pages.
Intention to Grant received for European Patent Application No. 12174677.0, mailed on May 6, 2016, 8 pages.
International Preliminary Report on Patentability received for PCT Patent Application No. PCT/US2007/088879, mailed on Jul. 7, 2009, 7 pages.
International Preliminary Report on Patentability received for PCT Patent Application No. PCT/US2007/077638 issued on Mar. 10, 2009, 7 pages.
International Preliminary Report on Patentability received for PCT Patent Application No. PCT/US2007/077644, issued on Mar. 10, 2009, 11 pages.
International Preliminary Report on Patentability received for PCT Patent Application No. PCT/US2007/077773, issued on Mar. 10, 2009, 6 pages.
International Preliminary Report on Patentability received for PCT Patent Application No. PCT/US2007/088893, mailed on Jul. 7, 2009, 8 pages.
International Search Report and Written Opinion received for PCT Patent Application No. PCT/US2007/077638, mailed on Feb. 19, 2008, 9 pages.
International Search Report and Written Opinion received for PCT Patent Application No. PCT/US2007/077644, mailed on May 30, 2008, 18 pages.
International Search Report and Written Opinion received for PCT Patent Application No. PCT/US2007/077773, mailed on Jan. 15, 2008, 8 pages.
International Search Report and Written Opinion received for PCT Patent Application No. PCT/US2007/088879, mailed on Jun. 30, 2008, 8 pages.
International Search Report and Written Opinion received for PCT Patent Application No. PCT/US2007/088893, mailed on Jul. 11, 2008, 10 pages.
International Search Report and Written Opinion received for PCT Patent Application No. PCT/US2008/050430, mailed on Sep. 1, 2008, 13 pages.
International Search Report and Written Opinion received for PCT Patent Application No. PCT/US2008/062307, Apr. 5, 2011, 13 pages.
Invitation to pay additional fees received for PCT Patent Application No. PCT/US2007/077644, mailed on Jan. 23, 2008, 10 pages.
Invitation to pay additional fees received for PCT Patent Application No. PCT/US2008/050430, Jun. 27, 2008, 7 pages.
Karlson et al., "AppLens and LaunchTile: Two Designs for One-Handed Thumb Use on Small Devices", CHI 2005, Papers: Small Devices 1, Apr. 2-7, 2005, pp. 201-210.
Karlson et al., "AppLens and LaunchTile: Two Designs for One-Handed Thumb Use on Small Devices", Powerpoint Presentation, CHI 2005, pp. 1-17.
Khella et al., "Pocket PhotoMesa: A Zoomable Image Browser for PDAs", Proceedings of the 3rd International Conference on Mobile and Ubiquitous Multimedia, available at <http://delivery.acm.org/10.1145/1060000/1052384/p19-khella.pdf?key1=1052384&key2=2419987911&coll=GUIDE&dl=GUIDE&CFID=47073625&CFTOKEN=65767142>, Oct. 29, 2004, 2 pages.
Kinoma, "Kinoma Player 4 EX Documentation", Available at <http://replay.waybackmachine.org/20061101175306/http://www.kinoma.com/index/pd-player-4>, Retrieved on Apr. 4, 2011, Nov. 1, 2006, 28 pages.
Laakko et al., "Adapting Web Content to Mobile User Agents", IEEE Internet Computing, vol. 9, No. 2, Mar./Apr. 2005, pp. 46-53.
Landragin Frédéric, "The Role of Gesture in Multimodal Referring Actions", Proceedings of the 4th IEEE International Conference on Multimodal Interfaces, available at <http://ieeexplore.iee.org/ie15/8346/26309/01166988pdf?arnumber=1166988>, 2002 6 pages.
Lie Håkonw., "Cascading Style Sheets chpt 8 CSS for small screens)", Online Available at <http://people.opera.com/howcome/2006/phd/css.pdf> University of Osloensis, MDCCCXI, pp. 243-247, Retrieved on Dec. 14, 2007, 2005, 8 pages.
Microsoft Corporation, "Microsoft Office Word 2003 SP2)", Microsoft Corporation, SP3 as of 2005, pages. MSWord 2003 Figures 1-5, 1983-2003, 5 pages.
Microsoft Word 2000 Microsoft Corporation, pages. MSWord Figures 1-5, 2005, 5 pages.
Microsoft Word, "Example of Scrolling pages. in Word 2003", 2003, 3 pages.
Milic-Frayling et al., "SmartView: Enhanced Document Viewer for Mobile Devices", Mircosoft Technical Report, available at <ftp://ftp.research.microsoft.com/pub/tr/tr-2002-114.pdf>, Retrieved on Dec. 17, 2007, Nov. 15, 2002, 10 pages.
Milic-Frayling et al., "SmartView: Flexible Viewing of We Page Contents", Proceedings of the Eleventh International World Wide Web Conference, available at <http://www2002.org/CDROM/poster/172/> Retrieved on May 5, 2008, May 11, 2002, 4 pages.
Motorola Mobility Opposition Grounds to Apple Inc. European Patent EP 2126678 dated Apr. 11, 2012, together with Exhibits E3, E4, and E5 re: CHT 2005, Apr. 2-7, 2005, Portland Oregon, USA, Apr. 2012, 53 pages.

(56) References Cited

OTHER PUBLICATIONS

Multimedia Video Formats, Available online at <http://www.w3sschols.com/media/media_videoformats.asp?output=print>, 2006, 2 pages.
Myers Brada. "Shortcutter for Palm", available online at <http://www.cs.cmu.edu/~pebbles/v5/shortcutter/palm/index.html>, 2006, 2 pages.
Non-Final Office Action received for U.S. Appl. No. 14/043,788, mailed on Jul. 14, 2016, 13 pages.
Non-Final Office Action received for U.S. Appl. No. 14/493,128, mailed on Sep. 12, 2016, 18 pages.
Non-Final Office Action received for U.S. Appl. No. 14/205,268, mailed on Feb. 18, 2016, 17 pages.
Non-Final Office Action received for U.S. Appl. No. 11/620,647 mailed on Jun. 24, 2010, 19 pages.
Non-Final Office Action received for U.S. Appl. No. 11/620,647 mailed on Nov. 17, 2009, 20 pages.
Non-Final Office Action received for U.S. Appl. No. 11/620,647, mailed on Oct. 13, 2011, 23 pages.
Non-Final Office Action received for U.S. Appl. No. 11/850,008, mailed on Aug. 2, 2010, 14 pages.
Non-Final Office Action received for U.S. Appl. No. 11/850,013, mailed on Jun. 11, 2010, 32 pages.
Non-Final Office Action received for U.S. Appl. No. 11/850,638, Jan. 17, 2012, 15 pages.
Non-Final Office Action received for U.S. Appl. No. 11/850,638, mailed on Jun. 27, 2013, 16 pages.
Non-Final Office Action received for U.S. Appl. No. 11/850,638, Oct. 26, 2010, 17 pages.
Non-Final Office Action received for U.S. Appl. No. 11/961,773, mailed on Apr. 15, 2011, 21 pages.
Non-Final Office Action received for U.S. Appl. No. 11/961,773, mailed on May 10, 2012, 14 pages.
Non-Final Office Action received for U.S. Appl. No. 11/968,067, mailed on Oct. 15, 2010, 13 pages.
Non-Final Office Action received for U.S. Appl. No. 12/042,299, mailed on Jan. 4, 2011, 9 pages.
Non-Final Office Action received for U.S. Appl. No. 12/981,433, mailed on Oct. 11, 2012, 29 pages.
Non-Final Office Action received for U.S. Appl. No. 13/155,304, mailed on Sep. 5, 2012, 11 pages.
Non-Final Office Action received for U.S. Appl. No. 13/464,454, mailed on Jul. 9, 2012, 13 pages.
Non-Final Office Action received for U.S. Appl. No. 14/043,788, mailed on Dec. 17, 2015, 13 pages.
Non-Final Office Action received for U.S. Appl. No. 14/205,268, mailed on Sep. 26, 2016, 18 pages.
Non-Final Office Action received for U.S. Appl. No. 15/807,283, mailed on Apr. 25, 2018, 12 pages.
Non-Final Office Action received for U.S. Appl. No. 16/288,632, mailed on Nov. 21, 2019, 10 pages.
Non-Final Office Action received for U.S. Appl. No. 17/098,672, mailed on Jan. 3, 2022, 14 pages.
Non-Final Office Action received for U.S. Appl. No. 17/970,453, mailed on Jun. 12, 2023, 17 pages.
Northern Telecom, "Meridian Mail PC User Guide", 1988, 17 pages.
Notice of Acceptance received for Australian Patent Application No. 2007289019, mailed on Jan. 25, 2010, 1 page.
Notice of Acceptance received for Australian Patent Application No. 2007292383, mailed on Jan. 4, 2012, 3 pages.
Notice of Acceptance received for Australian Patent Application No. 2011265564, mailed on Aug. 4, 2014, 2 pages.
Notice of Acceptance received for Australian Patent Application No. 2014262258, mailed on Apr. 1, 2016, 2 pages.
Notice of Allowance received for Canadian Patent Application No. 2,662,134, mailed on Dec. 10, 2014, 1 page.
Notice of allowance received for Chinese Patent Application No. 200780041222.6, mailed on Feb. 4, 2013, 2 pages.
Notice of Allowance received for Chinese Patent Application No. 200780052019.9, mailed on Mar. 19, 2014, 4 pages.
Notice of Allowance received for Chinese Patent Application No. 201210114287.1, mailed on Mar. 27, 2015, 4 pages.
Notice of Allowance received for Chinese Patent Application No. 201310136787.X, issued on Aug. 19, 2016, 4 pages.
Notice of Allowance received for Japanese Patent Application No. 2009-527566, mailed on Oct. 4, 2013, 3 pages.
Notice of Allowance received for Japanese Patent Application No. 2013-080820, mailed on Aug. 11, 2014, 3 pages.
Notice of Allowance received for Japanese Patent Application No. 2013-229756, mailed on Oct. 24, 2014, 3 pages.
Notice of Allowance received for Japanese Patent Application No. 2014-184473, mailed on Oct. 3, 2016, 3 pages.
Notice of Allowance received for Japanese Patent Application No. 2014-238083, mailed on Mar. 12, 2019, 3 pages.
Notice of Allowance received for Korean Patent Application No. 10-2009-7007064, mailed on Sep. 30, 2011, 2 pages.
Notice of Allowance received for Korean Patent Application No. 10-2009-7007067, mailed on Dec. 1, 2011, 2 pages.
Notice of Allowance received for Korean Patent Application No. 10-2011-7019633, mailed on May 18, 2012, 2 pages.
Notice of Allowance received for Korean Patent Application No. 10-2011-7026453, mailed on Apr. 10, 2015, 3 pages.
Notice of Allowance received for Korean Patent Application No. 10-2013-7028362, issued on Aug. 24, 2015, 5 pages.
Notice of Allowance received for Korean Patent Application No. 10-2013-7023012, issued on May 24, 2016, 5 pages.
Notice of Allowance received for U.S. Appl. No. 13/464,454, mailed on May 1, 2013, 6 pages.
Notice of Allowance received for U.S. Appl. No. 13/464,454, mailed on Oct. 29, 2012, 5 pages.
Notice of Allowance received for U.S. Appl. No. 11/620,647 mailed on Mar. 2, 2012, 8 pages.
Notice of Allowance received for U.S. Appl. No. 11/850,008, mailed on Mar. 11, 2011, 7 pages.
Notice of Allowance received for U.S. Appl. No. 11/850,013, mailed on Oct. 20, 2010, 20 pages.
Notice of Allowance received for U.S. Appl. No. 11/850,638, mailed on May 13, 2014, 5 pages.
Notice of Allowance received for U.S. Appl. No. 12/981,433, mailed on Feb. 3, 2014, 5 pages.
Notice of Allowance received for U.S. Appl. No. 12/981,433, mailed on Feb. 19, 2013, 5 pages.
Notice of Allowance received for U.S. Appl. No. 12/981,433, mailed on Sep. 27, 2013, 6 pages.
Notice of Allowance received for U.S. Appl. No. 13/155,304, mailed on Jul. 25, 2013, 10 pages.
Notice of Allowance received for U.S. Appl. No. 14/205,268, mailed on Feb. 13, 2017, 8 pages.
Notice of Allowance received for U.S. Appl. No. 14/493,128, mailed on Jun. 8, 2017, 7 pages.
Notice of Allowance received for U.S. Appl. No. 14/493,128, mailed on Nov. 8, 2017, 7 pages.
Notice of Allowance received for U.S. Appl. No. 15/807,283, mailed on Oct. 31, 2018, 10 pages.
Notice of Allowance received for U.S. Appl. No. 16/288,632, mailed on Jul. 20, 2020, 5 pages.
Notice of Allowance received for U.S. Appl. No. 17/098,672, mailed on Jun. 14, 2022, 7 pages.
Notice of Appeal in Expedited Appeal in Summary Proceedings dated Sep. 14, 2011, pp. 1-51.
Office Action received for Australian Patent Application No. 2007289019, mailed on Jul. 2, 2009, 3 pages.
Office Action received for Australian Patent Application No. 2007289019, mailed on Oct. 7, 2009, 2 pages.
Office Action received for Australian Patent Application No. 2007292383, mailed on Dec. 22, 2011, 2 pages.
Office Action received for Australian Patent Application No. 2007292383, mailed on Mar. 24, 2010, 2 pages.
Office Action received for Australian Patent Application No. 2007292383, mailed on May 12, 2011, 2 pages.

(56) References Cited

OTHER PUBLICATIONS

Office Action received for Australian Patent Application No. 2009100760, mailed on Sep. 28, 2009, 2 pages.
Office Action received for Australian Patent Application No. 2011265564, mailed on Jun. 14, 2013, 4 pages.
Office Action received for Australian Patent Application No. 2014262258, mailed on Jul. 13, 2015, 4 pages.
Office Action received for Australian Patent Application No. 2016204921, mailed on Mar. 24, 2017, 3 pages.
Office Action received for Canadian Patent Application No. 2,894,056, mailed on Jul. 4, 2016, 3 pages.
Office Action received for Chinese Patent Application No. 200780001140.9, mailed on Jan. 15, 2010, 5 pages.
Office Action received for Chinese Patent Application No. 200780001140.9, mailed on Jun. 10, 2011, 7 pages.
Office Action received for Chinese Patent Application No. 200780041222.6, mailed on Feb. 29, 2012, 6 pages.
Office Action received for Chinese Patent Application No. 200780041222.6, mailed on Jul. 25, 2012, 3 pages.
Office Action received for Chinese Patent Application No. 200780041222.6, mailed on Oct. 13, 2010, 10 pages.
Office Action received for Chinese Patent Application No. 200780052019, mailed on Jan. 22, 2013, 15 pages.
Office Action received for Chinese Patent Application No. 200780052019.9, mailed on Feb. 29, 2012, 6 pages.
Office Action received for Chinese Patent Application No. 200780052019.9, mailed on Jul. 30, 2013, 8 pages.
Office Action received for Chinese Patent Application No. 200710175852.3, mailed on Apr. 24, 2012, 10 pages.
Office Action received for Chinese Patent Application No. 200910175852.3, mailed on Jun. 3, 2014, 4 pages.
Office Action received for Chinese Patent Application No. 200910175852.3, mailed on Jun. 2, 2011, 6 pages.
Office Action received for Chinese Patent Application No. 201210114287.1, mailed on Jan. 8, 2014, 13 pages.
Office Action received for Chinese Patent Application No. 201210114287.1, mailed on Sep. 12, 2014, 9 pages.
Office Action received for Chinese Patent Application No. 201310136453.2, mailed on Apr. 21, 2015, 12 pages.
Office Action received for Chinese Patent Application No. 201310136453.2, mailed on Feb. 14, 2016, 28 pages.
Office Action received for Chinese Patent Application No. 201310136453.2, mailed on Nov. 8, 2016, 11 pages.
Office Action received for Chinese Patent Application No. 201310136787.X, mailed on Jan. 13, 2016, 28 pages.
Office Action received for Chinese Patent Application No. 201310136787.X, mailed on Jun. 1, 2015, 19 pages.
Office Action received for European Patent Application No. 07814690.9, mailed on Jun. 21, 2010, 5 pages.
Office Action received for European Patent Application No. 07814690.9, mailed on Oct. 19, 2010, 8 pages.
Office Action received for European Patent Application No. 07841980.1, mailed on Feb. 23, 2012, 5 pages.
Office Action received for European Patent Application No. 07869929.5, mailed on Dec. 27, 2010, 6 pages.
Office Action received for European Patent Application No. 09171787.6, mailed on Jan. 11, 2011, 1 page.
Office Action received for European Patent Application No. 09171787.6, mailed on Jul. 12, 2011, 5 pages.
Office Action received for European Patent Application No. 09700007.9, mailed on Nov. 26, 2010, 5 pages.
Office Action received for European Patent Application No. 12169786.6, mailed on Aug. 28, 2013, 5 pages.
Office Action received for European Patent Application No. 12174677.0, mailed on Aug. 28, 2013, 3 pages.
Office Action received for German Patent Application No. 112007002107.1, mailed on Jun. 7, 2010, 3 pages.
Office Action received for German Patent Application No. 112009000003.7, mailed on Aug. 10, 2010, 3 pages.
Office Action received for Japanese Patent Application No. 2009-527541, mailed on Dec. 7, 2012, 10 pages.
Office Action received for Japanese Patent Application No. 2009-527541, mailed on May 21, 2012, 3 pages.
Office Action received for Japanese Patent Application No. 2009-527541, mailed on Sep. 26, 2011, 3 pages.
Office Action received for Japanese Patent Application No. 2009-527566, mailed on Aug. 15, 2011, 3 pages.
Office Action received for Japanese Patent Application No. 2009-527566, mailed on Sep. 21, 2012, 3 pages.
Office Action received for Japanese Patent Application No. 2013-080820, mailed on Feb. 7, 2014, 7 pages.
Office Action received for Japanese Patent Application No. 2014-184473, mailed on May 9, 2016, 6 pages.
Office Action received for Japanese Patent Application No. 2014-184473, mailed on Oct. 5, 2015, 6 pages.
Office Action received for Japanese Patent Application No. 2014-238083, mailed on Feb. 24, 2017, 5 pages.
Office Action received for Japanese Patent Application No. 2014-238083, mailed on Feb. 26, 2016, 5 pages.
Office Action received for Japanese Patent Application No. 2014-238083, mailed on Jul. 20, 2018, 50 pages.
Office Action received for Japanese Patent Application No. 2014-238083, mailed on Sep. 5, 2017, 6 pages.
Office Action received for Korean Patent Application No. 10-2009-7007067, mailed on Aug. 30, 2011, 2 pages.
Office Action received for Korean Patent Application No. 10-2009-7007067, mailed on Nov. 12, 2010, 3 pages.
Office Action received for Korean Patent Application No. 10-2009-7026453, mailed on Apr. 26, 2013, 3 pages.
Office Action received for Korean Patent Application No. 10-2009-7026453, mailed on Feb. 17, 2014, 9 pages.
Office Action received for Korean Patent Application No. 10-2009-7028362, mailed on Dec. 16, 2014, 5 pages.
Office Action received for Korean Patent Application No. 10-2009-7028362, mailed on Feb. 17, 2014, 4 pages.
Office Action received for Korean Patent Application No. 10-2009-7023012, mailed on Dec. 1, 2014, 3 pages.
Office Action received for Korean Patent Application No. 10-2009-7023012, mailed on Jun. 30, 2015, 6 pages.
Office Action received for Korean Patent Application No. 1020167023037, mailed on Oct. 18, 2016, 13 pages.
Office Action received for Taiwan Patent Application No. 097100075, mailed on Dec. 29, 2011, 5 pages.
Oliver Dick, "Adding Multimedia to Your Web Site", Chapter 22, Web Publishing Professional Reference Edition, Available online at <http://www.ssuet.edu.pk/taimoor/books/1-57521-198-X/index.htm<, 1997, 14 pages.
Opera Software, "Download the Opera Mobile™ Browser", Available at <http://www.opera.com/products/mobile/products/>, retrived on Oct. 19, 2006, 5 pages.
Opera Software, "Opera 7.60 for Series 60 Mobile", Available at <http://www.jp.opera.com/support/tutorials/s60/760/O760manual.pdf>, 2009, 14 pages.
Opera Software, "Opera 8.5 Beta 2 for Windows Mobile, Pocket PC", Available at <http://www.opera.com/products/mobile/products/winmobileppc>, retrived on Apr. 5, 2006, 2 pages.
Opera Software, "Opera 8.5 for S60 Phones—Get the Full Internet Experience on Your Mobile Phone", Available at <http://www.symbian-freak.com/news/1105/opera.htm>, , Oct. 14, 2005, 3 pages.
Opera Software, "Opera for Mobile, The Full Web Anytime, Anywhere", Available at <http://www.opera.com/mobile>, Jan. 2006, 7 pages.
Opera Software, "Opera S60 Tutorial", Available at <http://www.xmarks.com/site/www.opera.com/support/tutorials/s60>, retrieved on Apr. 5, 2006, 5 pages.
Opera Software, "Opera for Windows Mobile Smartphone 2003 Tutorial", Available at <http://www.opera.com/support/tutorials/winmobile>, retrieved on Apr. 5, 2005, 4 pages.
Opera Software, "Opera for Windows Mobile Smartphone 2003 Tutorial", Available at <http://pressreleases.techwhack.com/1334/1411-opera-browser-features-zoom-and-password>, Nov. 14, 2005, 3 pages.

(56) References Cited

OTHER PUBLICATIONS

Palme et al., "MIME Encapsulation of Aggregate Documents, such a HTML", Network Working Group, 1999, 24 pages.
Palmone, "Your Mobile Manager", Chapter 2, LifeDrive™ User's Guide, available at <http://www.palm.com/us/support/handbooks/lifedrive/en/lifedrive_handbook.pdf>, 2005, 23 pages.
Petition for Inter Partes Review of U.S. Pat. No. 7,864,163, pp. 1-225.
Playing QuickTime Movies, Available online at <http://www.3schools.com/media/media_quicktime.asp?output=print>, 2006, 2 pages.
Playing Videos On The Web, Available online at <http://www.w3schools.com/media/media_browservideos.asp?out=print>, 2006, 3 pages.
Pleading notes Mr B.J. Berghuis van Woortman, in matter of *Apple Inc.* vs *Samsung Electronics*, Case No. KG ZA 11-730 and KG ZA 11-731, Aug. 10-11, 2010, pp. 1-16.
Pleading notes Mr Kleemans, Mr Blomme and Mr Van Oorschot, in matter of *Apple Inc.* vs *Samsung Electronics*, Case No. KG ZA 11-730 and KG ZA 11-731, Aug. 10, 2011, 35 pages.
Raman et al., "Application-Speficic Workload Shaping in Multimedia-Enabled Personal Mobile Devices", CODES+ISSS, Oct. 22-25, 2006, pp. 4-9.
Raman T., "Eyes-Free User Interaction", Google Research Available at <http://emacspeak.sf.net/raman>, Feb. 9, 2009, 25 pages.
Robie Jonathan, "What is the Document Object Model?", Texcel Research, available at <http://www.w3.org/TR-DOM/introduction.html>, 2006, 5 pages.
Rohrer Tim, "Metaphors We Compute by: Bringing Magic into Interface Design", Available online at <http://www.uoregon.edu/-uophil/metaphor/gui4web.htm>, retrieved on Jun. 13, 2006, 7 pages.
Roto et al., "Minimap—A Web Page Visualizatino Method for Mobile Phones", Proceedings of the SIGCHI Conference on Human Factors in Computing Systems, Apr. 22-27, 2006, pp. 35-44.
Salmre I., "Characteristics of Mobile Applications", Chapter 2, Salmre_02.fm, Dec. 20, 2004, pp. 19-36.
*Samsung Electronics GmbH* vs *Apple Inc.*, "List of scrolling and document translation, scaling and rotation on a touch-screen display", Opposition, Jan. 30, 2012, 27 pages.
*Samsung Electronics* vs *Apple Inc.*, Statement of Defense Also Counterclaim, Case No. KG ZA 2011-730, Jul. 20, 2011, 44 pages.
*Samsung Electronics* vs *Apple Inc.*, Statement of Defense Also Counterclaim, Case No. KG ZA 2011-731, Jul. 20, 2011, 48 pages.
Schmandt et al., "A Conversational Telephone Messaging System", IEEE Transactions on Consumer Electronics, vol. CE-30, Aug. 1984, pp. xxi-xxiv.
Schmandt et al., "Phone Slave: A Graphical Telecommunications Interface", Proceedings of the SID, vol. 26, No. 1, 1985, 4 pages.
Schmandt et al., "Phone Slave: A Graphical Telecommunications Interface". Society for Information Display, International Symposium Digest of Technical Papers, Jun. 1984, 4 pages.
Schreiner Tony, "High DPI in IE: Tip & Myster Solved", Tony Schreiner's Blog, available at <http://blogs.msdn.com/tonyschr/archive/2004/05/05/126305.aspx>, May 2004, 2 pages.
Stampfli Tracy, "Exploring Full-Screen Mode in Flash Player 9", Available online at >http://www.adobe.com/devnet/flashplayer/articles/full_screen_mode.html>, Nov. 14, 2006, 2 pages.
Stanek et al., "Video and Animation Plug-Ins", Chapter 9, Web Publishing Professional Reference Edition, Available online at >http://www.ssuet.edupk/taimoor/books/1-57521-198-X/index.htm>. 1997, 18 pages.
Summons to Attend Oral Proceeding received for European Patent Application No. 12169786.6, mailed on Jul. 31, 2014, 3 pages.
Summons to Attend Oral Proceeding received for European Patent Application No. 07814690.9, mailed on Nov. 22, 2011, 4 pages.
Summons to Attend Oral Proceeding received for European Patent Application No. 07841980.1, mailed on Sep. 28, 2012, 8 pages.
Summons to Attend Oral Proceeding received for European Patent Application No. 07869929.5, mailed on Dec. 13, 2011, 6 pages.
Summons to Attend Oral Proceeding received for European Patent Application No. 07869929.5, mailed on Jan. 23, 2012, 1 page.
Summons to attend oral proceeding received for European Patent Application No. 09171787.6, mailed on Sep. 11, 2015, 2 pages.
Summons to Oral Proceeding received for European Patent Application No. 12169786.6, mailed on Dec. 12, 2016, 9 pages.
Summons to Oral Proceeding received for European Patent Application No. 07814690.9, mailed on Feb. 1, 2016, 12 pages.
Surfin'Safari,"XUL", Available at >http://weblogs.mozillazine.org/hyatt.archives/2003_10.html>, Oct. 2003, 7 pages.
Tidwell Jenifer, "Animated Transition", Designing Interfaces, Patterns for effective Interaction Design, First Edition, Nov. 2005, 4 pages.
Tidwell Jenifer, "Designing Interfaces, Animated Transition", Archieved by Internet Wayback Machine, Available at <https://web.archive.org/web/20060205040223/http://designinginterfaces.com/:80/Animated_ Transition>, Retrieved on Mar. 20, 2018, 2005, 2 pages.
VERSIONTRACKER,"Photogather—7.2.6. Hi-res Image Viewer & Editor for Palm", Available online at <http://www.versiontracker.com/dyn/moreinfo/palm/4624>, retrieved on Jun. 12, 2006, 2006, 5 pages.
Warabino et al., "Video Transcoding Proxy for 3Gwireless Mobile Internet Access", IEEE Communications Magazine, vol. 38, No. 10. Oct. 2000, pp. 66-71.
Wave Technologies International Inc., "Certified Internet Webmaster Foundations Study Guide", A Thomson Learning Company, CIWF-SGMN-0101A. copyright 1988-2000, 88 pages.
Weblogs, "An Overview of WebCore", Chapter 2, WebCore Documentation, available at <http:/lweblogs.mozillazine.org/hyatt/WebCore/chapter2.html>, 2006, 3 pages.
Weblogs, "Downloading and Building WebCore", Chapter 1, WebCore Documentation, available at <http://weblogs.mozillazine.org/hyatt/WebCore/chapter1.html>, 2006, 2 pages.
webmasterworld.com, "Page Zooming with IE-Hidden Feature!", Available at <http://www.webmasterworld.com/forum83/4179.htm>, Jul. 2004, 7 pages.
Wikipedia, "Comparison of Layout Engines", The free encyclcopedia, available at <http://en.wikipedia.org/wiki/Comparison_of_layout_engines>, 2006, 3 pages.
Wikipedia, "History of YouTube", The Free Encyclcopedia, available at <http://en.wikipedia.org/wiki/History_of_YouTube>, retrieved on Mar. 15, 2011, 4 pages.
Wikipedia, "KDE", The free encyclcopedia, available at <http://en.wikipedia.org/wiki/KDE>, 2006, 9 pages.
Wikipedia, "KHTML", The Free Encyclcopedia, available at <http://en.wikipedia.org/wiki/KHTML>, 2006, 3 pages.
Wikipedia, "List of Layout Engines", The Free Encyclcopedia, available at <http://en.wikipedia.org/wiki/List_of_layout_engines>, 2006, 1 page.
Williams Martyn, "LG's Cell Phone Can Pause Live TV", PC World, Oct. 11, 2005, 2 pages.
Wobbrock et al., "WebThumb: Interaction Techniques for Small-Screen Browsers", UIST'02, Paris France, Oct. 27-30, 2002, pp. 205-208.
Xiao et al., "Slicing*—Tree Based Web Page Transformation for Small Displays", International Conference on Information and Knowledge Management, Oct. 31-Nov. 5, 2005, 2 pages.
Xie et al., "Efficient Browsing of Web Search Results on Mobile Devices Based on Block Importance Model", Microsoft Research Asia, 2005, 10 pages.
Yin et al., "Using Link Analysis to Improve Layout on Mobile Devices", Proceedings of the 13th international conference on World Wide Web, available at <http://www.iw3c2.org/WWW2004/docs/1p338.pdf>, May 17-22, 2004, pp. 338-344.
Youtube, "Broadcast Yourself", Available at <www.youtube.com>, Nov. 1, 2005, 2 pages.
Youtube, "Broadcasting Ourselves", The Official Youtube blog Available at <http://youtube-global.blogspot.in/2005_11_01_archive.html>, Nov. 15, 2005, 5 pages.
Zytronic, "Touchscreen User Manual Zytronic X-Y Controller Serial and USB)", XP007916436, Nov. 17, 2006, pp. 1-51.

* cited by examiner

PORTABLE ELECTRONIC DEVICE PERFORMING WINDOW OPERATIONS WITH GESTURES ON A TOUCHSCREEN

RELATED APPLICATIONS

This application is a continuation of U.S. patent application Ser. No. 17/970,453, entitled "Portable Electronic Device Performing Similar Operations for Different Gestures," filed Oct. 20, 2022, which is a continuation of U.S. patent application Ser. No. 17/098,672, now U.S. Pat. No. 11,481,112, entitled "Portable Electronic Device Performing Similar Operations for Different Gestures." filed Nov. 16, 2020, which is a continuation of U.S. patent application Ser. No. 16/288,632, now U.S. Pat. No. 10,838,617, entitled "Portable Electronic Device Performing Similar Operations for Different Gestures," filed Feb. 28, 2019, which is a continuation of U.S. patent application Ser. No. 15/807,283, now U.S. Pat. No. 10,222,977, entitled "Portable Electronic Device Performing Similar Operations for Different Gestures," filed Nov. 8, 2017, which is a continuation of U.S. patent application Ser. No. 14/493,128, now U.S. Pat. No. 9,927,970, entitled "Portable Electronic Device Performing Similar Operations for Different Gestures," filed Sep. 22, 2014, which is a continuation of U.S. patent application Ser. No. 11/850,638, now U.S. Pat. No. 8,842,074, entitled "Portable Electronic Device Performing Similar Operations for Different Gestures." filed Sep. 5, 2007, which claims priority to U.S. Provisional Patent Application Nos. 60/937, 993, "Portable Multifunction Device," filed Jun. 29, 2007; 60/879,469, "Portable Multifunction Device," filed Jan. 8, 2007; 60/883,817, "Portable Electronic Device Performing Similar Operations for Different Gestures," filed Jan. 7, 2007; 60/879,253, "Portable Multifunction Device," filed Jan. 7, 2007; and Ser. No. 60/824,769, "Portable Multifunction Device," filed Sep. 6, 2006. All of these applications are incorporated by reference herein in their entirety.

This application is related to the following applications: (1) U.S. patent application Ser. No. 10/188,182, "Touch Pad For Handheld Device," filed on Jul. 1, 2002; (2) U.S. patent application Ser. No. 10/722,948, "Touch Pad For Handheld Device," filed on Nov. 25, 2003; (3) U.S. patent application Ser. No. 10/643,256, "Movable Touch Pad With Added Functionality," filed on Aug. 18, 2003; (4) U.S. patent application Ser. No. 10/654,108, "Ambidextrous Mouse," filed on Sep. 2, 2003; (5) U.S. patent application Ser. No. 10/840,862, "Multipoint Touchscreen," filed on May 6, 2004; (6) U.S. patent application Ser. No. 10/903,964, "Gestures For Touch Sensitive Input Devices," filed on Jul. 30, 2004; (7) U.S. patent application Ser. No. 11/038,590, "Mode-Based Graphical User Interfaces For Touch Sensitive Input Devices" filed on Jan. 18, 2005; (8) U.S. patent application Ser. No. 11/057,050, "Display Actuator," filed on Feb. 11, 2005; (9) U.S. Provisional Patent Application No. 60/658,777, "Multi-Functional Hand-Held Device," filed Mar. 4, 2005; and (10) U.S. patent application Ser. No. 11/367,749, "Multi-Functional Hand-Held Device," filed Mar. 3, 2006. All of these applications are incorporated by reference herein.

TECHNICAL FIELD

The disclosed embodiments relate generally to portable electronic devices, and more particularly, to portable electronic devices that perform similar operations in response to different finger gestures.

BACKGROUND

As portable electronic devices become more compact, and the number of functions performed by a given device increases, it has become a significant challenge to design a user interface that allows users to easily interact with a multifunction device. This challenge is particular significant for handheld portable electronic devices, which have much smaller screens than desktop or laptop computers.

One important aspect of measuring a user interface's user-friendliness is whether the user interface accepts different types of user actions that correspond to the same function. Different users can choose different user actions based on their own preferences or habits. One user can choose different user actions at different times depending on which user action is more convenient than others at a specific moment.

But many conventional user interfaces, such as those that include physical pushbuttons, often have no such inflexibility. All users have to interact with the user interfaces in a specific manner to get desired results whether or not the manner is contrary to most users' preferences or habits. When coupled with the time consuming requirement to memorize these specific manners and the difficulty in activating a desired pushbutton, such inflexibility is becoming increasingly frustrating to most users.

Accordingly, there is a need for portable electronic devices with more flexible and intuitive user interfaces that perform similar operations in response to different finger gestures.

SUMMARY

The above deficiencies and other problems associated with known portable devices are reduced or eliminated by the disclosed portable multifunction device. In some embodiments, the portable electronic device has a touch-sensitive display (also known as a "touch screen" or "touch screen display") with a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive display. Instructions for performing operations may be included in a computer readable storage medium or other computer program product configured for execution by one or more processors.

One aspect of the invention involves a computer-implemented method in which a portable electronic device with a touch screen: displays an application on the touch screen; and when the application is in a predefined mode, performs a predefined operation in response to each gesture of a set of multiple distinct gestures on the touch screen.

Another aspect of the invention involves a computer-implemented method in which a portable electronic device with a touch screen: displays a first application; when the first application is in a first mode, performs a first operation upon detecting a first gesture on the touch screen display; and performs the first operation upon detecting a second gesture on the touch screen display, wherein the second gesture is different from the first gesture.

Another aspect of the invention involves a portable electronic device. The device includes a touch screen display, one or more processors, memory, and one or more programs. The one or more program are stored in the memory and configured to be executed by the one or more processors. The one or more programs include: instructions for displaying an application; and instructions for performing a predefined operation in response to each gesture of a set of multiple distinct gestures on the touch screen display when the application is in a predefined mode.

Another aspect of the invention involves a computer-program product that includes a computer readable storage medium and a computer program mechanism (e.g., one or more computer programs) embedded therein. The computer program mechanism includes instructions, which when executed by a portable electronic device with a touch screen display, cause the device to: display an application; and when the application is in a predefined mode, perform a predefined operation in response to each gesture of a set of multiple distinct gestures on the touch screen display.

Another aspect of the invention involves a graphical user interface (GUI) on a portable electronic device with a touch screen display. The GUI has an application displayed in a predefined mode and the application performs a predefined operation in response to each gesture of a set of multiple distinct gestures on the touch screen display.

Another aspect of the invention involves a portable electronic device with a touch screen display, comprising: means for displaying an application; and means for performing a predefined operation in response to each gesture of a set of multiple distinct gestures on the touch screen display when the application is in a predefined mode.

Thus, the invention provides a transparent and intuitive user interface that performs similar operations in response to different finger gestures on a portable electronic device with a touch screen display.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1:
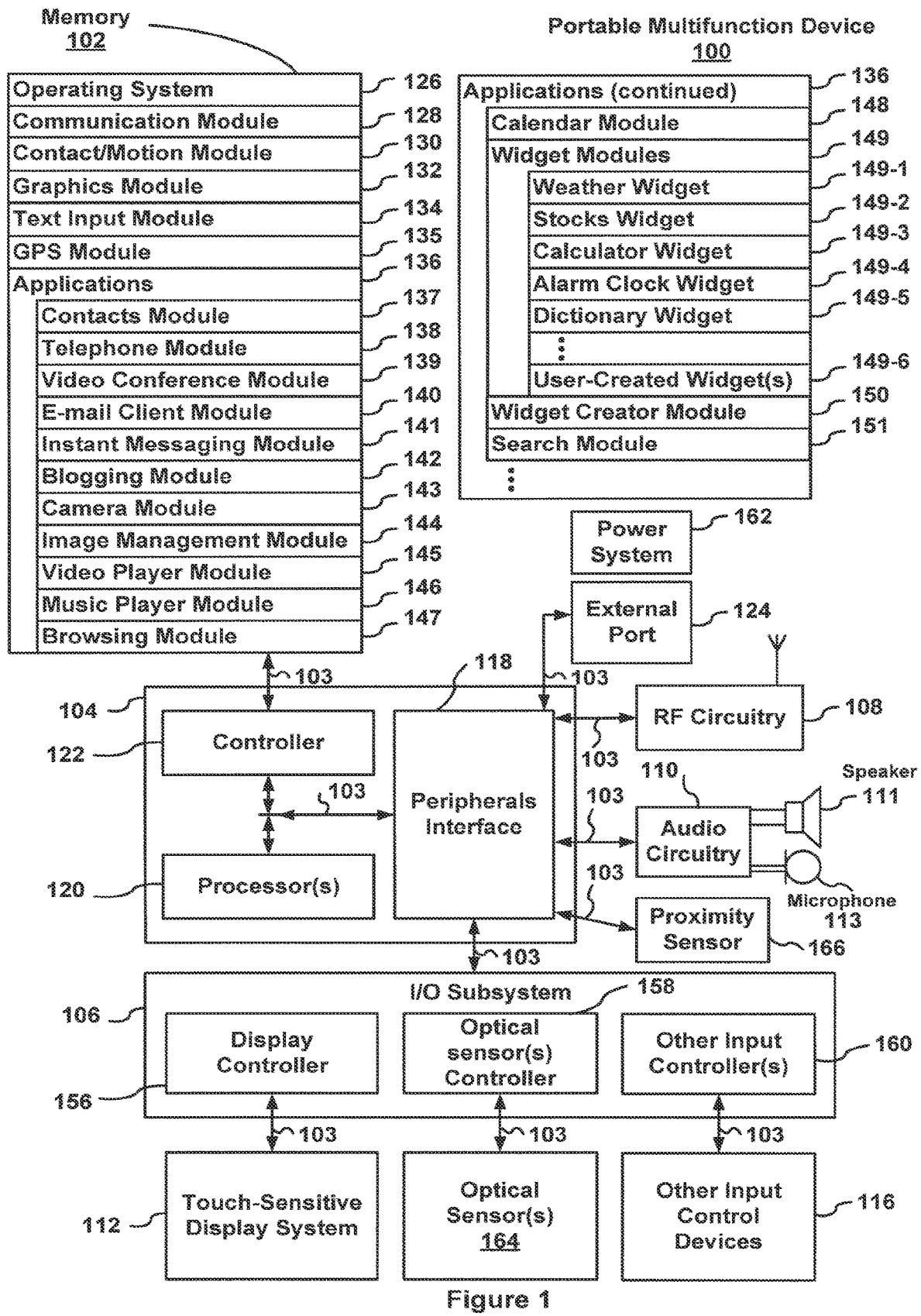
FIG. 1 is a block diagram illustrating a portable electronic device with a touch-sensitive display in accordance with some embodiments.

Reference will now be made in detail to embodiments, examples of which are illustrated in the accompanying drawings. In the following detailed description, numerous specific details are set forth in order to provide a thorough understanding of the invention. However, it will be apparent to one of ordinary skill in the art that the invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first gesture could be termed a second gesture, and, similarly, a second gesture could be termed a first gesture, without departing from the scope of the present invention.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of a portable electronic device, user interfaces for such devices, and associated processes for using such devices are described. In some embodiments, the device is a portable communications device such as a mobile telephone that also contains other functions, such as PDA and/or music player functions.

The user interface may include a physical click wheel in addition to a touch screen or a virtual click wheel displayed on the touch screen. A click wheel is a physical user-interface device that may provide navigation commands based on an angular displacement of the wheel or a point of contact with the wheel by a user of the portable electronic device. A click wheel may also be used to provide a user command corresponding to selection of one or more items, for example, when the user of the portable electronic device presses down on at least a portion of the wheel or the center of the wheel. Alternatively, breaking contact with a click wheel image on a touch screen surface may indicate a user command corresponding to selection. For simplicity, in the discussion that follows, a portable electronic device that includes a touch screen is used as an exemplary embodiment. It should be understood, however, that some of the user interfaces and associated processes may be applied to other devices, such as personal computers and laptop computers, which may include one or more other physical user-interface devices, such as a physical click wheel, a physical keyboard, a mouse and/or a joystick.

The device supports a variety of applications, such as one or more of the following: a telephone application, a video conferencing application, an email application, an instant messaging application, a blogging application, a photo management application, a digital camera application, a digital video camera application, a web browsing application, a digital music player application, and/or a digital video player application.

The various applications that may be executed on the device may use at least one common physical user-interface device, such as the touch screen. One or more functions of the touch screen as well as corresponding information displayed on the device may be adjusted and/or varied from one application to the next and/or within a respective application. In this way, a common physical architecture (such as the touch screen) of the device may support the variety of applications with user interfaces that are intuitive and transparent.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards for Portable Electronic Devices," filed Jul. 24, 2006, and Ser. No. 11/459,615 "Touch Screen Keyboards for Portable Electronic Devices," filed Jul. 24, 2006, the contents of which are hereby incorporated by reference. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the portable electronic device may utilize common and/or different keyboard embodiments. Thus, the keyboard embodiment used may be tailored to at least some of the applications. In some embodiments, one or more keyboard embodiments may be tailored to a respective user. For example, based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Attention is now directed towards embodiments of the device. FIG. 1 is a block diagram illustrating a portable electronic device 100 with a touch-sensitive display 112 in accordance with some embodiments. The touch-sensitive display 112 is sometimes called a "touch screen" for convenience. The device 100 may include a memory 102 (which may include one or more computer readable storage mediums), a memory controller 122, one or more processing units (CPU's) 120, a peripherals interface 118, RF circuitry 108, audio circuitry 110, a speaker 111, a microphone 113, an input/output (I/O) subsystem 106, other input or control devices 116, and an external port 124. The device 100 may include one or more optical sensors 164. These components may communicate over one or more communication buses or signal lines 103.

It should be appreciated that the device 100 is only one example of a portable electronic device 100, and that the device 100 may have more or fewer components than shown, may combine two or more components, or a may have a different configuration or arrangement of the components. The various components shown in FIG. 1 may be implemented in hardware, software or a combination of hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (not shown). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of the speaker 111 and/or the microphone 113. The one or more buttons may include a push button (e.g., 206, FIG. 2). A quick press of the push button may disengage a lock of the touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference. A longer press of the push button (e.g., 206) may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology, although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112. A touch-sensitive display in some embodiments of the touch screen 112 may be analogous to the multi-touch sensitive tablets described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference. However, a touch screen 112 displays visual output from the portable electronic device 100, whereas touch sensitive tablets do not provide visual output. The touch screen 112 may have a resolution in excess of 100 dpi. In an exemplary embodiment, the touch screen in the display system has a resolution of approximately 168 dpi. The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

A touch-sensitive display in some embodiments of the touch screen 112 may be as described in the following applications: (1) U.S. patent application Ser. No. 11/381,313, "Multipoint Touch Surface Controller," filed on May 2, 2006; (2) U.S. patent application Ser. No. 10/840,862, "Multipoint Touchscreen," filed on May 6, 2004; (3) U.S. patent application Ser. No. 10/903,964, "Gestures For Touch Sensitive Input Devices," filed on Jul. 30, 2004; (4) U.S. patent application Ser. No. 11/048,264, "Gestures For Touch Sensitive Input Devices," filed on Jan. 31, 2005; (5) U.S. patent application Ser. No. 11/038,590, "Mode-Based Graphical User Interfaces For Touch Sensitive Input Devices," filed on Jan. 18, 2005; (6) U.S. patent application Ser. No. 11/228,758, "Virtual Input Device Placement On A Touch Screen User Interface," filed on Sep. 16, 2005; (7) U.S. patent application Ser. No. 11/228,700, "Operation Of A Computer With A Touch Screen Interface," filed on Sep. 16, 2005; (8) U.S. patent application Ser. No. 11/228,737, "Activating Virtual Keys Of A Touch-Screen Virtual Keyboard," filed on Sep. 16, 2005; and (9) U.S. patent application Ser. No. 11/367,749, "Multi-Functional Hand-Held Device," filed on Mar. 3, 2006. All of these applications are incorporated by reference herein.

In some embodiments, in addition to the touch screen, the device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the portable electronic device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable electronic devices.

The device 100 may also include one or more optical sensors 164. FIG. 1 shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (sometimes called a camera module), the optical sensor 164 may capture still images or video. In some embodiments, an optical sensor is located on the back of the device 100, opposite the touch screen display 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The device 100 may also include one or more proximity sensors 166. FIG. 1 shows a proximity sensor 166 coupled to the peripherals interface 118. Alternately, the proximity sensor 166 may be coupled to an input controller 160 in the I/O subsystem 106. The proximity sensor 166 may perform as described in U.S. patent application Ser. No. 11/241,839, "Proximity Detector in Handheld Device," filed Sep. 30, 2005, and Ser. No. 11/240,788, "Proximity Detector in Handheld Device," filed Sep. 30, 2005, which are hereby incorporated by reference. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel 116.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts module 137, email client module 140, IM module 141, blogging 142, browser module 147, and any other application that needs text input).

The GPS module 135 determines the location of the device and provides this information for use in various applications (e.g., to telephone module 138 for use in location-based dialing, to camera module 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an email client module 140;
- an instant messaging (IM) module 141;
- a blogging module 142;
- a camera module 143 for still and/or video images;
- an image management module 144;

a video player module 145;
a music player module 146;
a browser module 147;
a calendar module 148;
widget modules 149, which may include weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6; and/or
search module 151.

Examples of other applications 136 that may be stored in memory 102 include memo pad and other word processing applications, JAVA-enabled applications, encryption, digital rights management, voice recognition, and voice replication.

In conjunction with touch screen 112, display controller 156, contact module 130, graphics module 132, text input module 134, and camera module 143, the image management module 144 may be used to arrange, modify or otherwise manipulate, label, delete, present (e.g., in a digital slide show or album), and store still and/or video images. Embodiments of user interfaces and associated processes using image management module 144 are described further below.

In conjunction with RF circuitry 108, touch screen 112, display system controller 156, contact module 130, graphics module 132, and text input module 134, the browser module 147 may be used to browse the Internet, including searching, linking to, receiving, and displaying web pages or portions thereof, as well as attachments and other files linked to web pages. Embodiments of user interfaces and associated processes using browser module 147 are described further below.

Note that the above identified modules and applications (including the image management module 144 and the browser module 147) correspond to a set of instructions for performing one or more functions described above. These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, the device 100 is a device where operation of a predefined set of functions on the device is performed exclusively through a touch screen 112 and/or a touchpad. By using a touch screen and/or a touchpad as the primary input/control device for operation of the device 100, the number of physical input/control devices (such as push-buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 2:
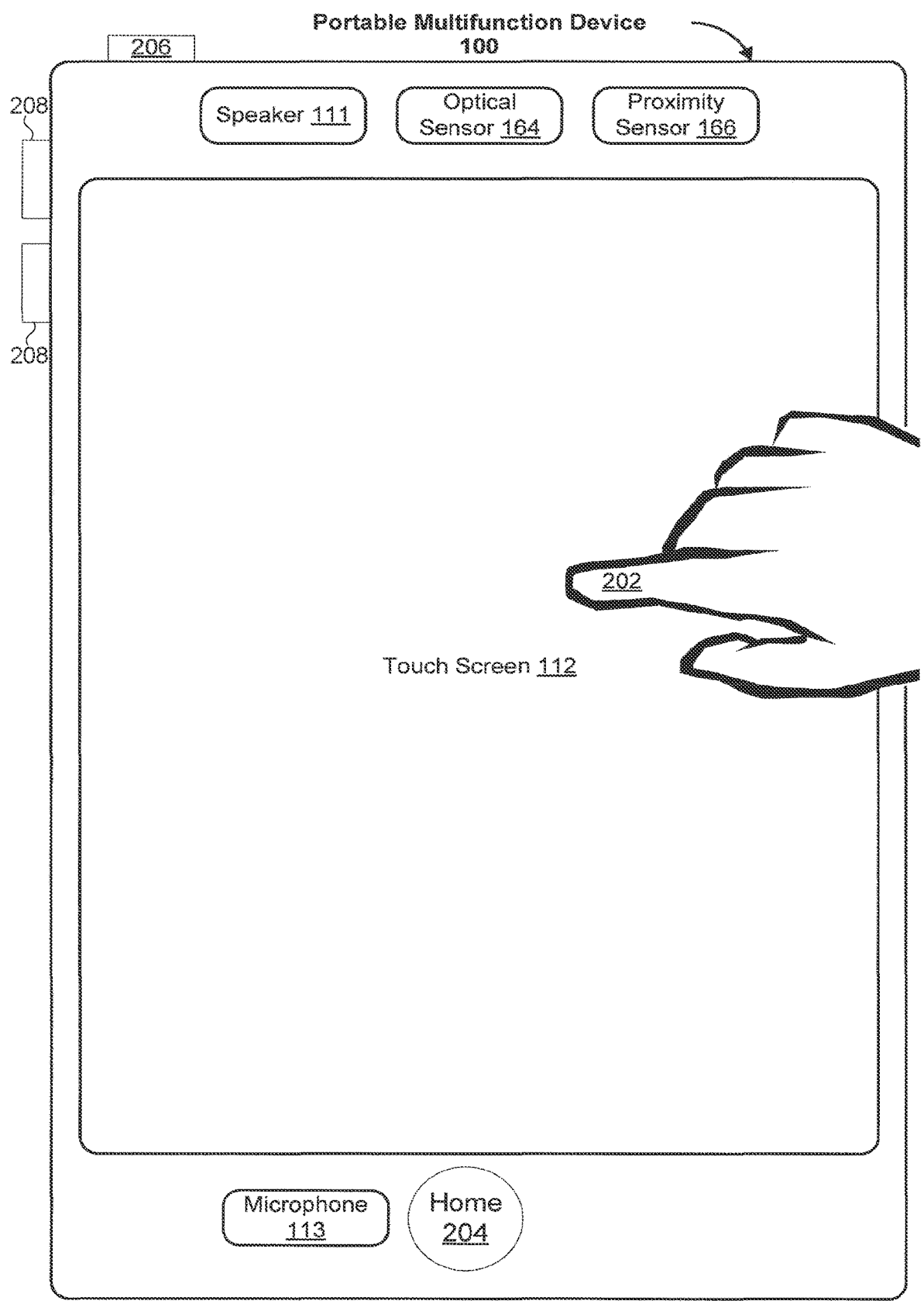
FIG. 2 illustrates a portable electronic device having a touch screen in accordance with some embodiments.

FIG. 2 illustrates a portable electronic device 100 having a touch screen 112 in accordance with some embodiments. The touch screen may display one or more graphics. In this embodiment, as well as others described below, a user may select one or more of the graphics by making contact or touching the graphics, for example, with one or more fingers 202 (not drawn to scale in the figure) or a stylus (not shown in the figure). In some embodiments, selection of one or more graphics occurs when the user breaks contact with the one or more graphics. In some embodiments, the contact may include a gesture, such as one or more taps, one or more swipes (e.g., from left to right, or right to left, or back-and-forth in both directions; upward, or downward, or upward and downward) and/or a rolling of a finger (from right to left, left to right, upward and/or downward) that has made contact with the device 100. In some embodiments, inadvertent contact with a graphic may not select the graphic. For example, a swipe gesture with that sweeps over an application icon may not select the corresponding application when the gesture corresponding to selection is a tap. In other words, the portable electronic device 100 interprets the meaning of a gesture and acts accordingly after considering which application or module is in use at the moment.

The device 100 may also include one or more physical buttons, such as "home" or menu button 204. As described previously, the menu button 204 may be used to navigate to any application 136 in a set of applications that may be executed on the device 100. Alternatively, in some embodiments, the menu button is implemented as a soft key in a GUI in touch screen 112.

In one embodiment, the device 100 includes a touch screen 112, a menu button 204, a push button 206 for powering the device on/off and locking the device, and volume adjustment button(s) 208. The push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, the device 100 also may accept verbal input for activation or deactivation of some functions through the microphone 113.

Attention is now directed towards embodiments of user interfaces ("UI") and associated processes that may be implemented on a portable electronic device 100.

Figure 3:
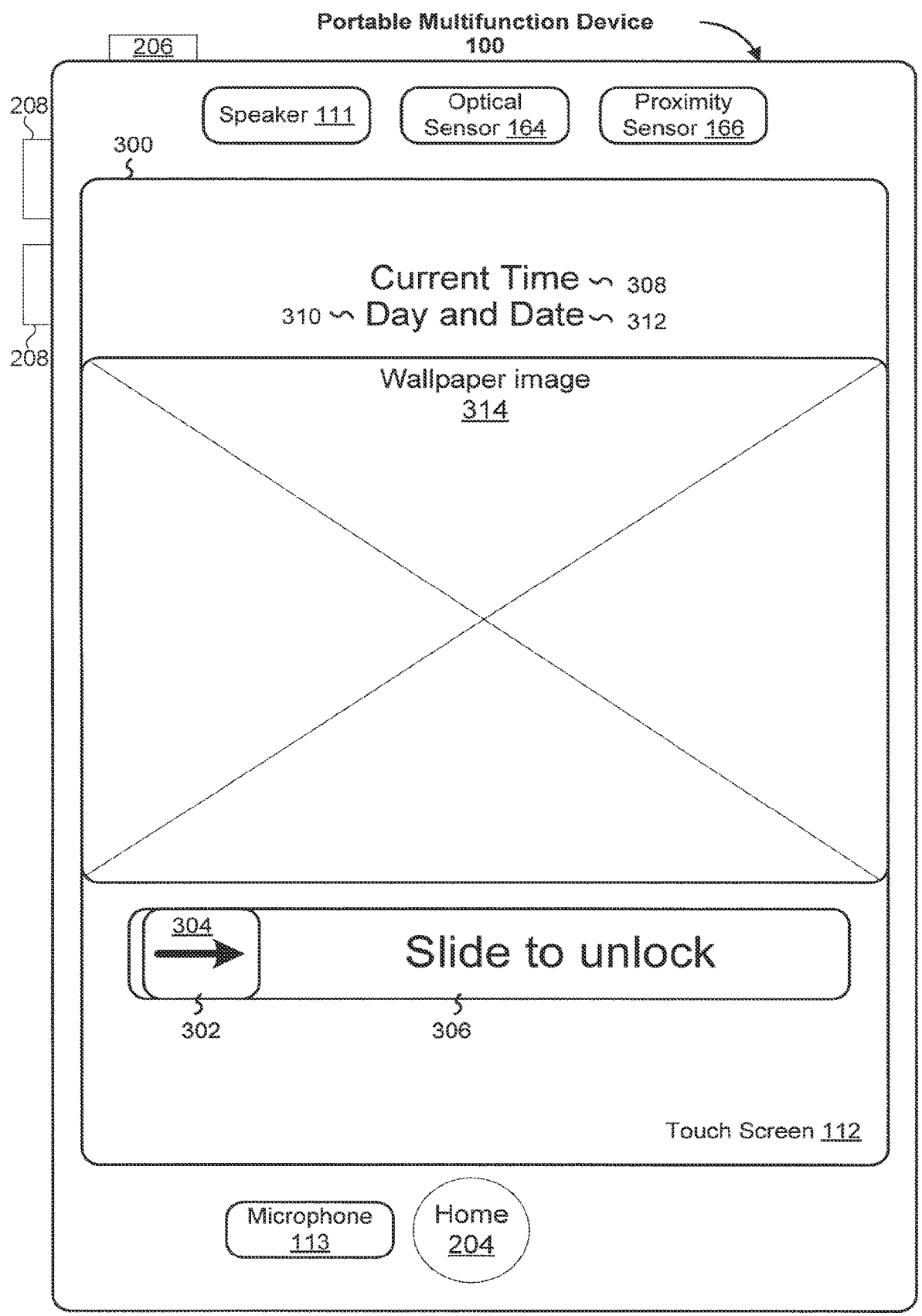
FIG. 3 illustrates an exemplary user interface for unlocking a portable electronic device in accordance with some embodiments.

FIG. 3 illustrates an exemplary user interface for unlocking a portable electronic device in accordance with some embodiments. In some embodiments, user interface 300 includes the following elements, or a subset or superset thereof:

Unlock image 302 that is moved with a finger gesture to unlock the device;
Arrow 304 that provides a visual cue to the unlock gesture;
Channel 306 that provides additional cues to the unlock gesture;
Time 308;
Day 310;
Date 312; and
Wallpaper image 314.

In some embodiments, the device detects contact with the touch-sensitive display (e.g., a user's finger making contact on or near the unlock image 302) while the device is in a user-interface lock state. The device moves the unlock image 302 in accordance with the contact. The device transitions to a user-interface unlock state if the detected contact corresponds to a predefined gesture, such as moving the unlock image across channel 306. Conversely, the device maintains the user-interface lock state if the detected contact does not correspond to the predefined gesture. As noted above, processes that use gestures on the touch screen to unlock the device are described in U.S. patent application Ser. No. 11/322,549, "Unlocking a Device by Performing Gestures on an Unlock Image," filed Dec. 23, 2005, which is hereby incorporated by reference.

Figure 4:
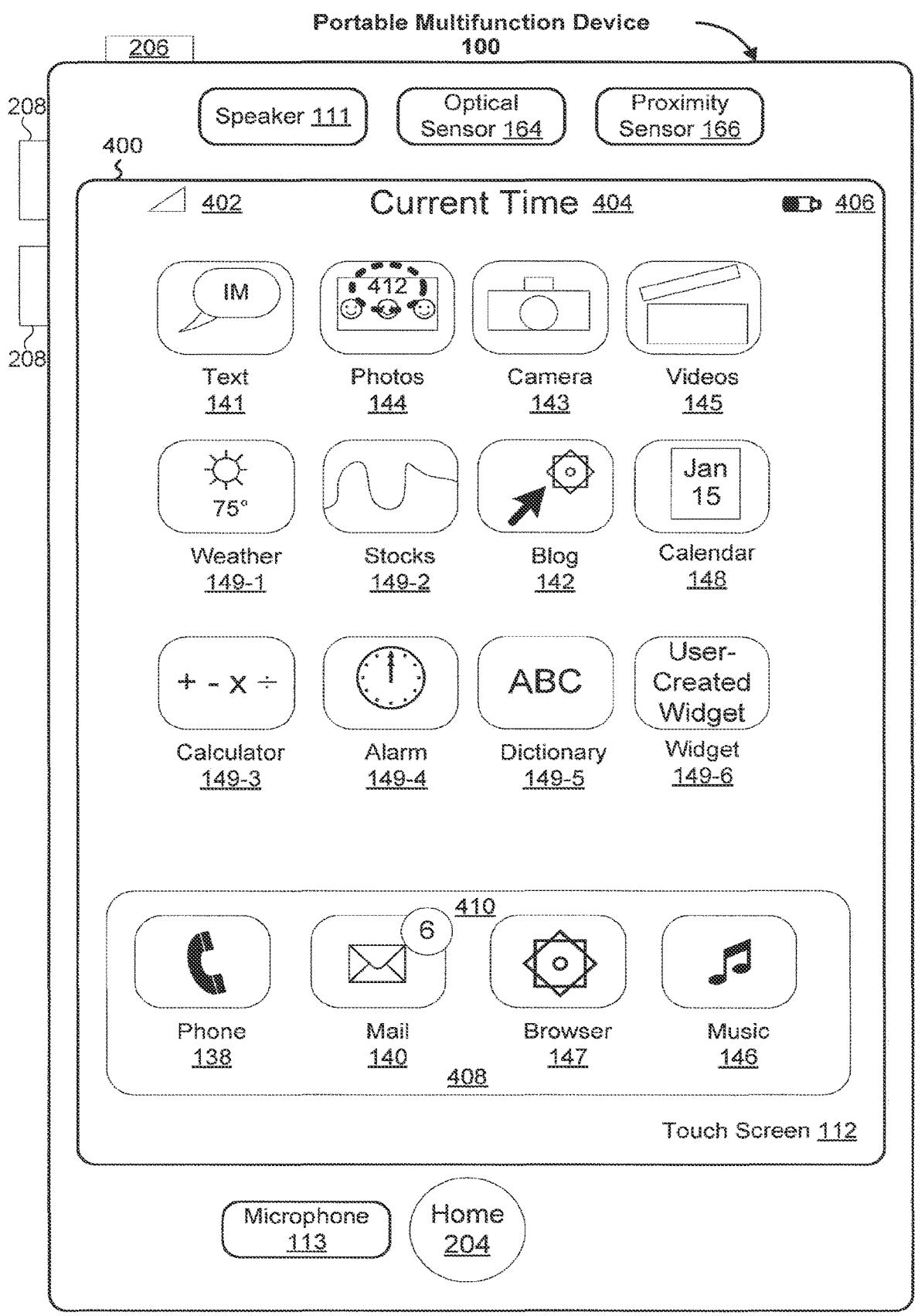
FIG. 4 illustrates an exemplary user interface for a menu of applications on a portable electronic device in accordance with some embodiments.

FIG. 4 illustrates an exemplary user interface for a menu of applications on a portable electronic device in accordance with some embodiments. In some embodiments, user interface 400 includes the following elements, or a subset or superset thereof:

Signal strength indicator 402 for wireless communication;
Time 404;
Battery status indicator 406;
Tray 408 with icons for frequently used applications, such as:
  Phone 138;
  Email client 140, which may include an indicator 410 of the number of unread emails;
  Browser 147; and
  Music player 146; and
Icons for other applications, such as:
  IM 141;
  Image management 144;
  Camera 143;
  Video player 145;
  Weather 149-1;
  Stocks 149-2;
  Blog 142;
  Calendar 148;
  Calculator 149-3;
  Alarm clock 149-4;
  Dictionary 149-5; and
  User-created widget 149-6.

In some embodiments, UI 400 displays all of the available applications 136 on one screen so that there is no need to scroll through a list of applications (e.g., via a scroll bar). In some embodiments, as the number of applications increase, the icons corresponding to the applications may decrease in size so that all applications may be displayed on a single screen without scrolling. In some embodiments, having all applications on one screen and a menu button enables a user to access any desired application with at most two inputs, such as activating the menu button 204 and then activating a desired application (e.g., activating the image management module 144 by a finger tap 412 or other finger gesture on the icon corresponding to the application). Activating the desired application leads to another user interface corresponding to the user-selected application.

Figure 5:
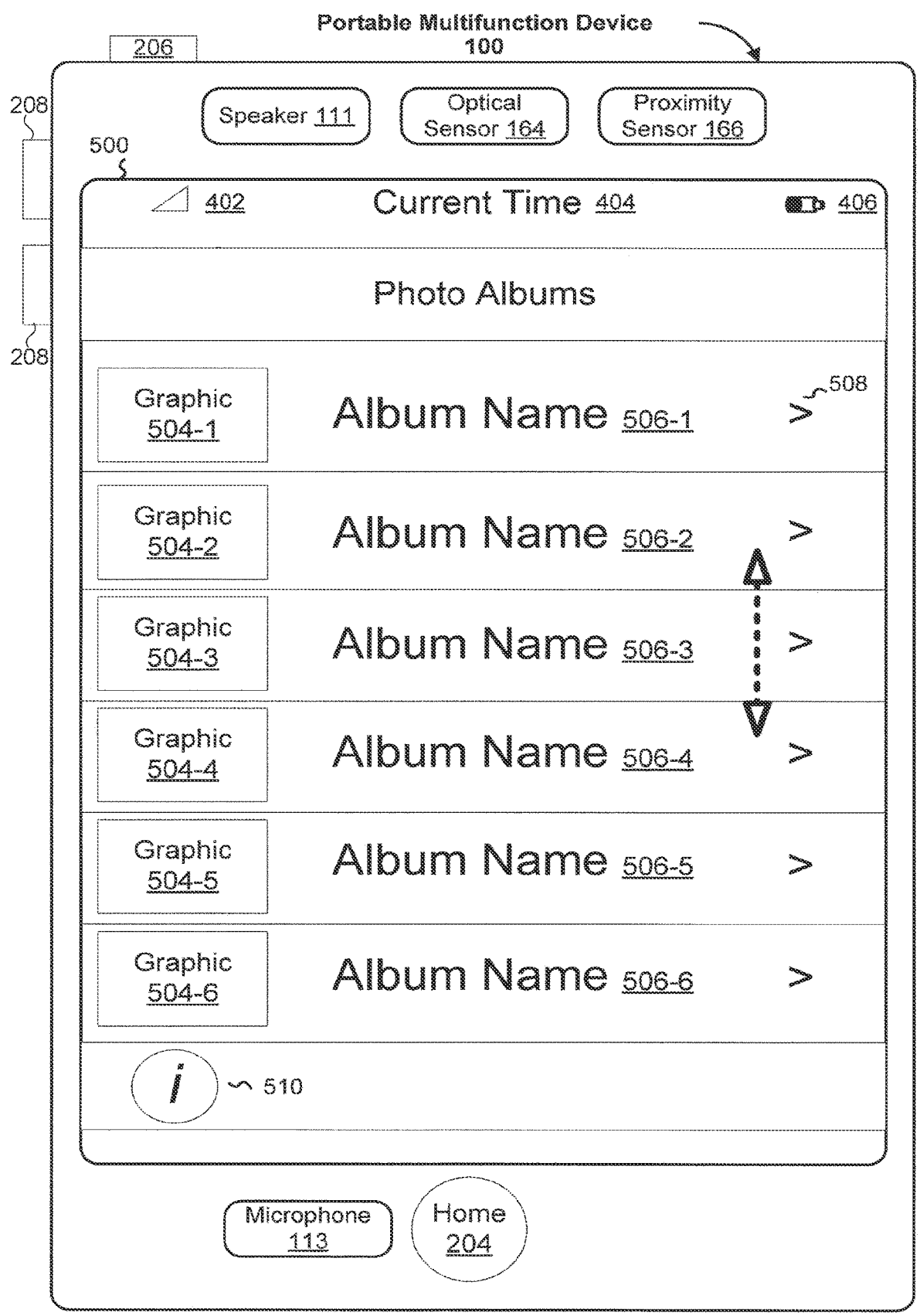
FIG. 5 illustrates an exemplary user interface for viewing albums in accordance with some embodiments.

FIG. 5 illustrates an exemplary user interface for viewing photo albums in accordance with some embodiments. In some embodiments, user interface 500 includes the following elements, or a subset or superset thereof:

402, 404, and 406, as described above;
Graphics 504, e.g., thumbnail images of the first picture or a user-selected picture in the corresponding albums;
Album names 506;
Selection icons 508 that when activated (e.g., by a finger gesture on the icon) initiates display of the corresponding album (e.g., UI 600, FIG. 6); and
Settings icon 510, that brings up a settings menu when activated by a user gesture (e.g., a tap gesture).

Figure 6:
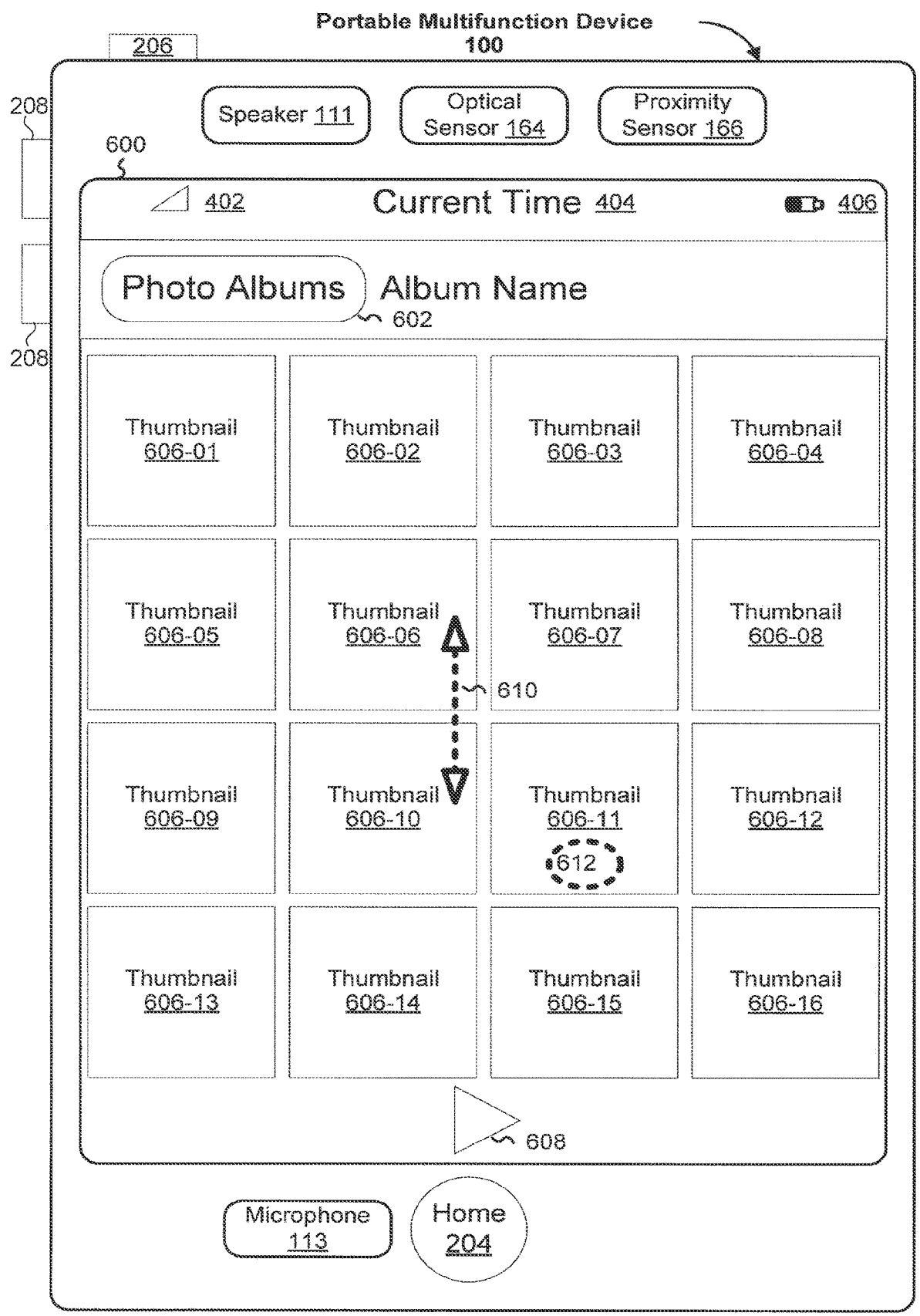
FIG. 6 illustrates an exemplary user interface for viewing an album in accordance with some embodiments.

FIG. 6 illustrates an exemplary user interface for viewing an album in accordance with some embodiments. In some embodiments, user interface 1000 includes the following elements, or a subset or superset thereof:

402, 404, and 406, as described above;

Photo albums icon 602 that when activated (e.g., by a finger gesture on the icon) initiates transfer to the photo albums UI (e.g., UI 500);
Thumbnail images 606 of images in the corresponding album;
Play icon 608 that when activated (e.g., by a finger gesture on the icon) initiates a slide show of the images in the album;

In some embodiments, the user may scroll through the thumbnails 606 using vertically upward/downward gestures 610 on the touch screen. A stationary gesture on a particular thumbnail (e.g., a finger tap 612 on thumbnail 606-11) initiates transfer of the application to a different mode, i.e., an enlarged display of the corresponding image (e.g., UI 700, FIG. 7).

Figure 7:
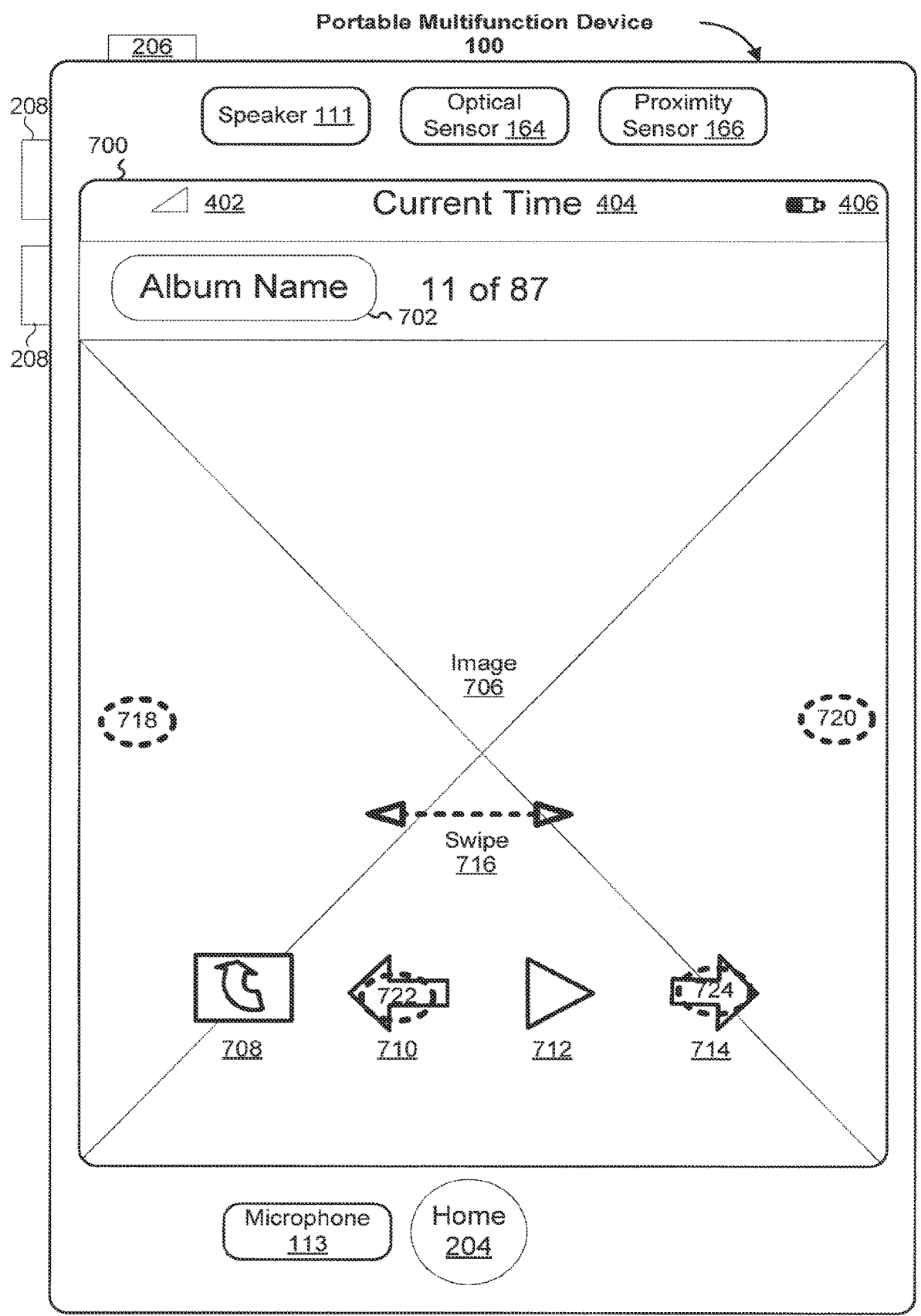
FIG. 7 illustrates an exemplary user interface for viewing enlarged images in an album in accordance with some embodiments.

FIG. 7 illustrates an exemplary user interface for viewing enlarged images in an album in accordance with some embodiments. In some embodiments, user interface 700 includes the following elements, or a subset or superset thereof:

402, 404, and 406, as described above;
Album name icon 702 that when activated (e.g., by a finger gesture on the icon) initiates transfer to the corresponding album UI (e.g., UI 600);
Image 706;
Additional options icon 708 that when activated (e.g., by a finger gesture on the icon) initiates transfer to a UI with additional options for use of image 706;
Previous image icon 710 that when activated (e.g., by a finger gesture 722 on the icon) initiates display of the previous image in the album (e.g., 606-10);
Play icon 712 that when activated (e.g., by a finger gesture on the icon) initiates a slide show of the images in the album; and
Next image icon 714 that when activated (e.g., by a finger gesture 724 on the icon) initiates display of the next image in the album (e.g., 606-12).

In some embodiments, selecting the previous or next image icon is not the only way of displaying the previous or next image in the album. For example, the user can initiate viewing of the previous image by making a tap gesture 718 on the left side of the image or making a swipe gesture 716 from left to right on the image. The image 706 moves off screen to the right as the previous image moves on screen from the left. Similarly, the user can initiate viewing of the next image by making a tap gesture 720 on the right side of the image or making a swipe gesture 716 from right to left on the image. The image 706 moves off screen to the left as the next image moves on screen from the right.

With multiple ways to perform the same task, the portable electronic device enables a user to choose whichever the user prefers, thereby making the photo management simpler and more intuitive.

FIGS. 8A through 8D illustrate exemplary user interfaces for a browser in accordance with some embodiments.

Figure 8A:
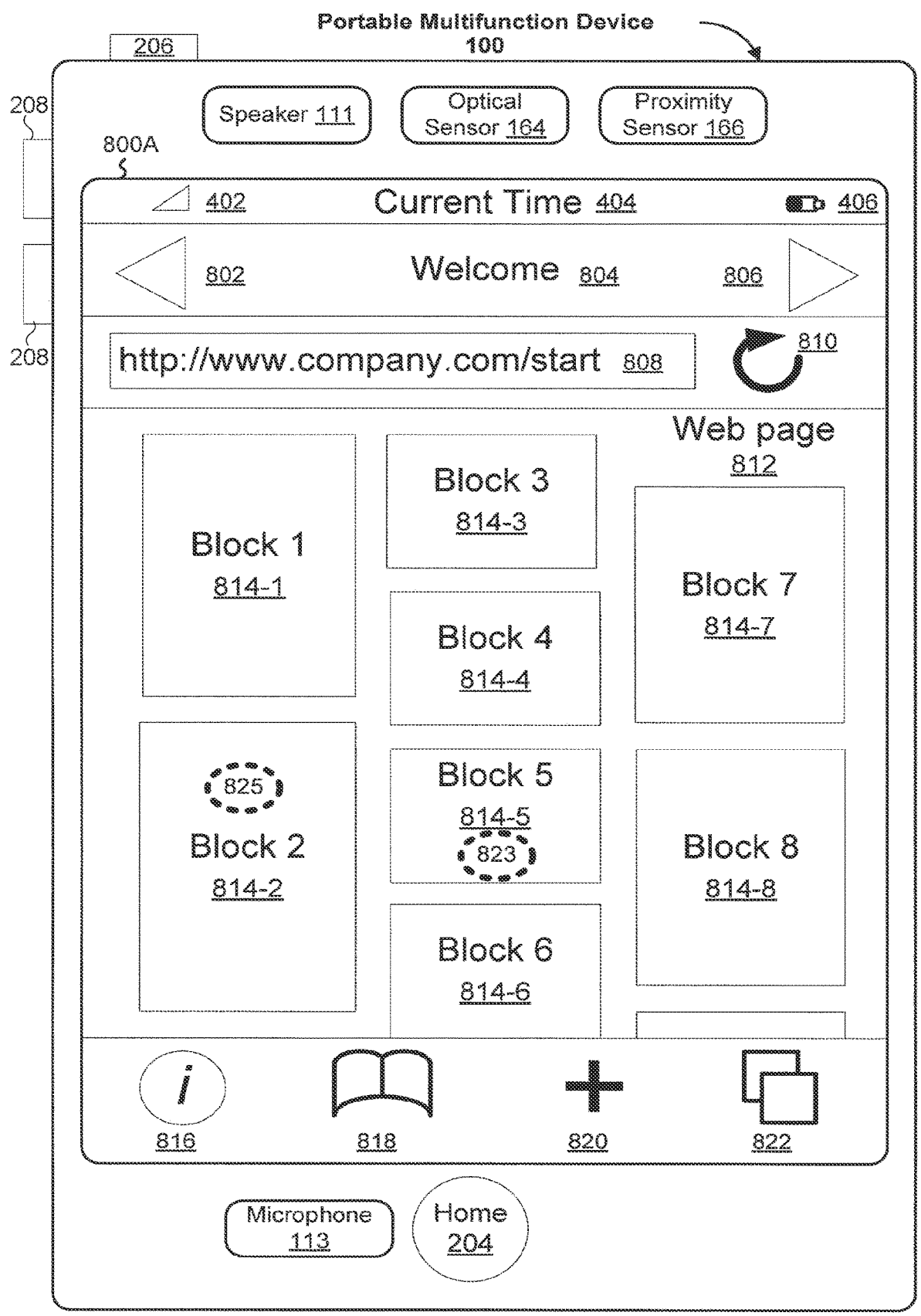
FIGS. 8A through SD illustrate exemplary user interfaces for a browser in accordance with some embodiments.
Figure 8B:
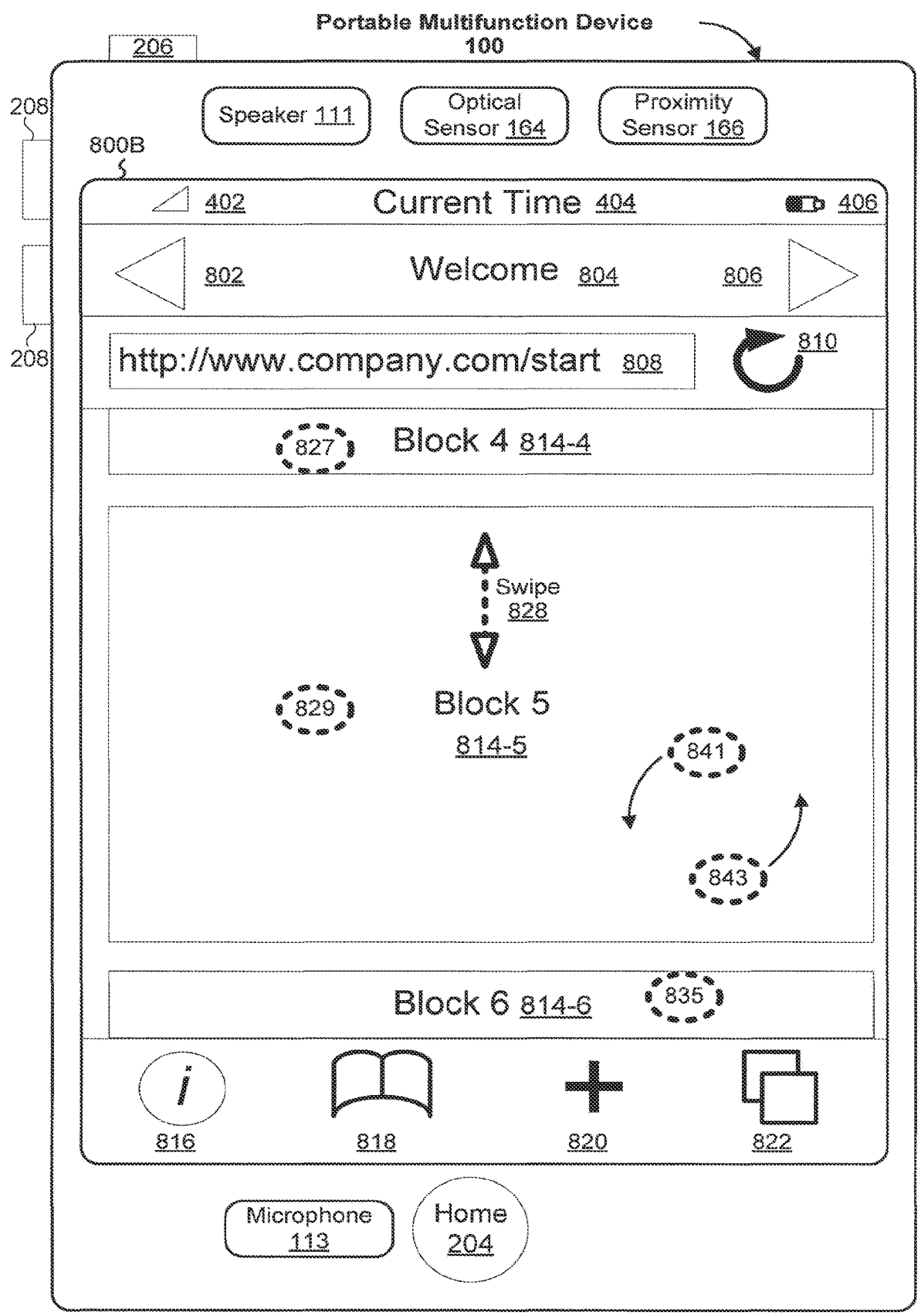
Figure 8C:
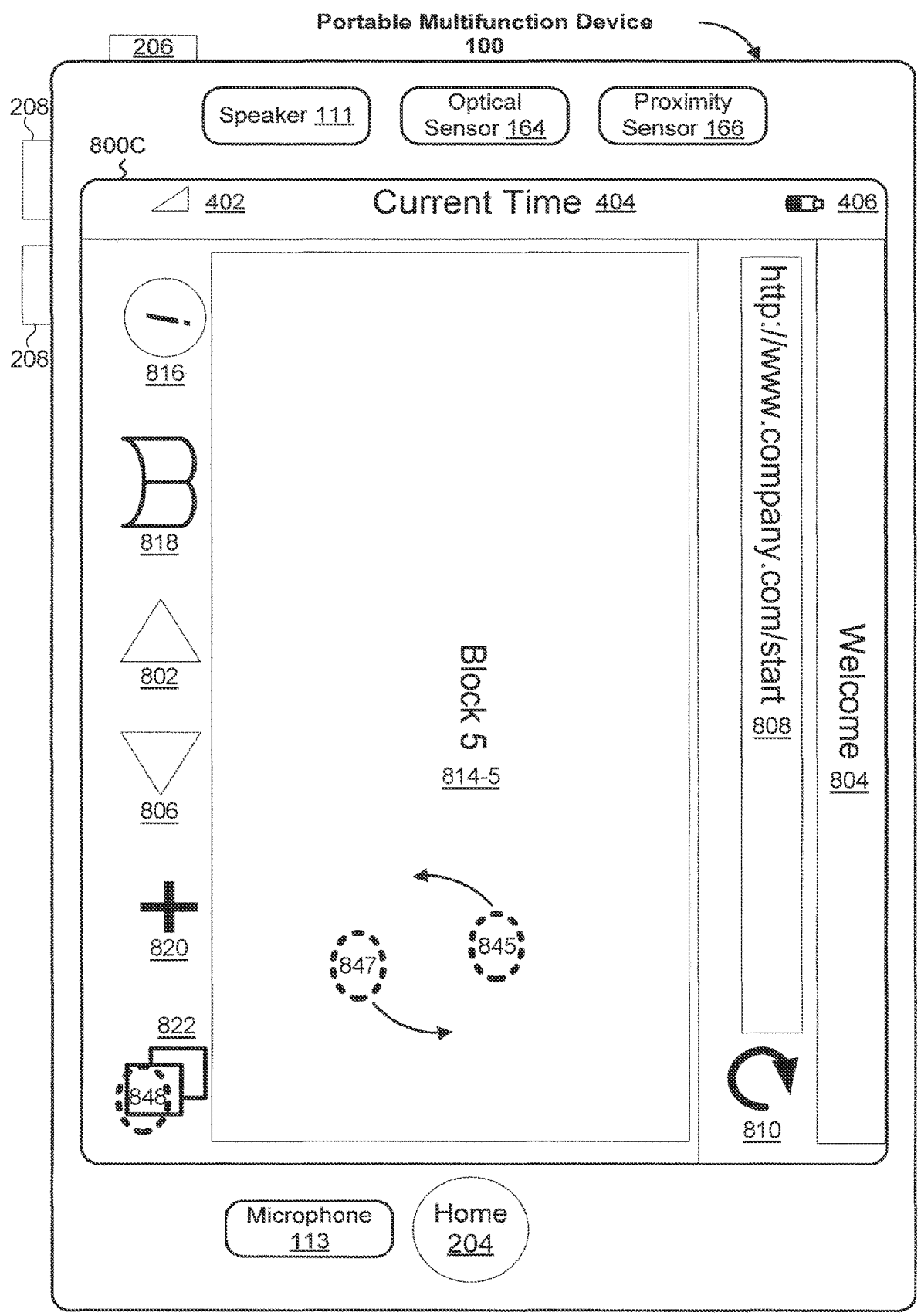
Figure 8D:
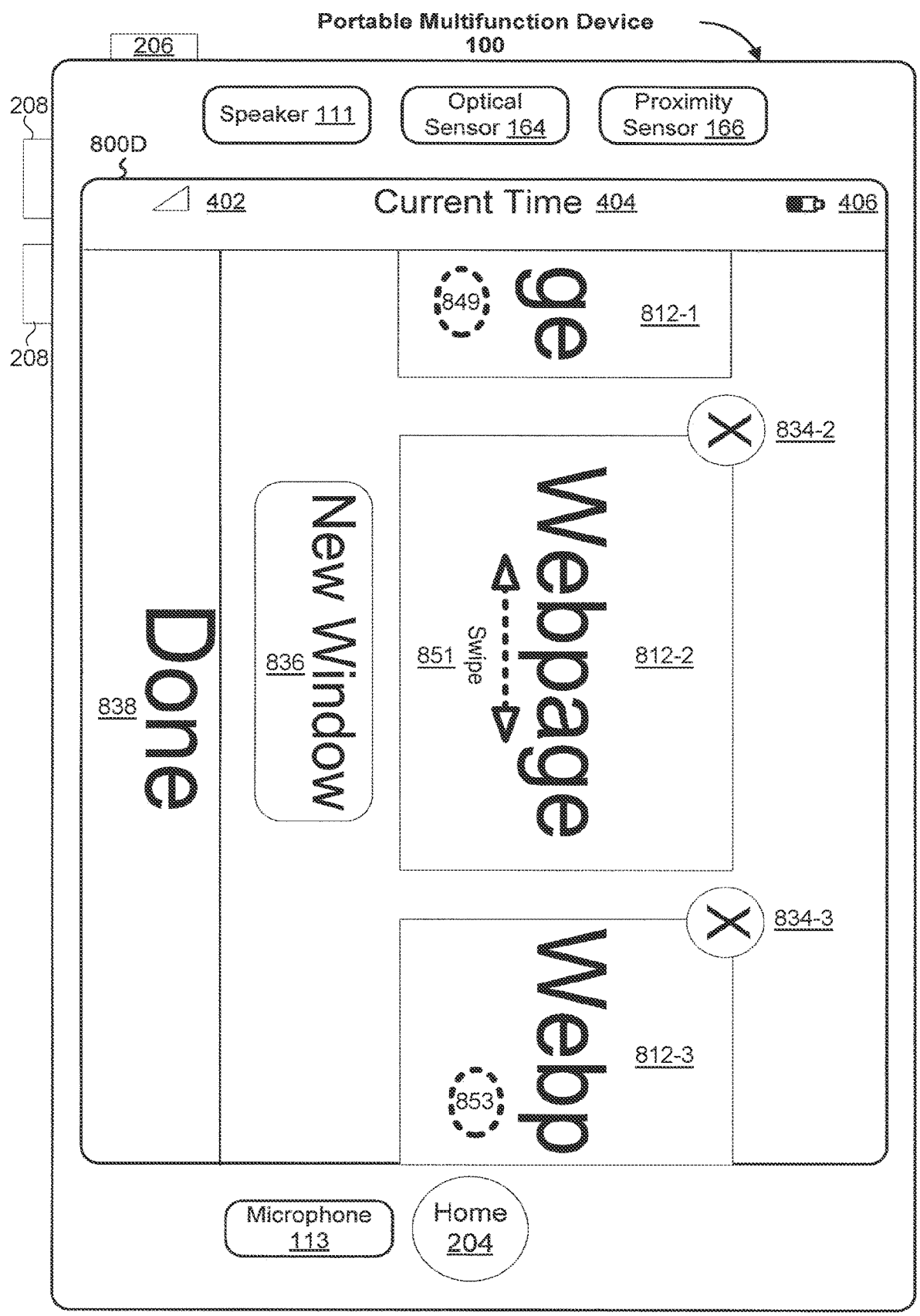

In some embodiments, user interface 800A includes the following elements, or a subset or superset thereof:

402, 404, and 406, as described above;
Previous page icon 802 that when activated (e.g., by a finger tap on the icon) initiates display of the previous web page;
Web page name 804;
Next page icon 806 that when activated (e.g., by a finger tap on the icon) initiates display of the next web page;
URL (Uniform Resource Locator) entry box 808 for inputting URLs of web pages;

Refresh icon 810 that when activated (e.g., by a finger tap on the icon) initiates a refresh of the web page;

Web page 812 or other structured document, which includes one or more blocks 814 of text content and other graphics (e.g., images);

Settings icon 816 that when activated (e.g., by a finger tap on the icon) initiates display of a settings menu for the browser;

Bookmarks icon 818 that when activated (e.g., by a finger tap on the icon) initiates display of a bookmarks list or menu for the browser;

Add bookmark icon 820 that when activated (e.g., by a finger tap on the icon) initiates display of a UI for adding bookmarks; and New window icon 822 that when activated (e.g., by a finger lap on the icon) initiates display of a UI for adding new windows to the browser (e.g., UI 800D, FIG. 8D).

In some embodiments, in response to a predefined gesture by the user on a block 814 (e.g., a single tap gesture or a double tap gesture), the portable device initiates a predefined mode of the browser application that, e.g., causes the block to be enlarged and centered (or substantially centered) in the web page display. For example, in response to a single tap gesture 823 on block 814-5, block 814-5 may be enlarged and centered in the display, as shown in UI 800B, FIG. 8B.

In some embodiments, the width of the user-selected block is scaled to fil the touch screen display. In some embodiments, the width of the block is scaled to fill the touch screen display with a predefined amount of padding along the sides of the display. In some embodiments, a zooming animation of the block is displayed during enlargement of the block. Similarly, in response to a single tap gesture 825 on block 814-2, block 814-2 may be enlarged with a zooming animation and two-dimensionally scrolled to the center of the display (not shown).

In some embodiments, the device analyzes the render tree of the web page 812 to determine the blocks 814 in the web page. In some embodiments, a block 814 corresponds to a render node that is: a replaced inline, a block, an inline block, or an inline table.

In some embodiments, in response to the same predefined gesture by the user on a block 814 (e.g., a single tap gesture or a double tap gesture) that is already enlarged and centered, the enlargement and/or centering is substantially or completely reversed. As shown in the UI 800B (FIG. 8B), in response to a single tap gesture 829 on block 814-5, the web page image may zoom out and return to UI 800A, FIG. 8A.

In some embodiments, in response to a predefined gesture (e.g., a single tap gesture or a double tap gesture) by the user on a block 814 that is already enlarged but not centered, the block is centered (or substantially centered) in the web page display. For example, in response to a single tap gesture 827 on block 814-4, block 814-4 may be centered (or substantially centered) in the web page display. Similarly, in response to a single tap gesture 835 on block 814-6, block 814-6 may be centered (or substantially centered) in the web page display. Thus, for a web page display that is already enlarged, in response to a predefined gesture, the device may display in an intuitive manner a series of blocks that the user wants to view. This same gesture may initiate different actions in different contexts (e.g., (1) zooming and/or enlarging a block in combination with scrolling when the block is displayed in reduced size, and (2) reversing the enlargement and/or centering if the block is already centered and enlarged).

In some embodiments, in response to a substantially vertical upward (or downward) swipe gesture 828 by the user, the web page (or, more generally, an electronic document) may scroll one-dimensionally upward (or downward) in the vertical direction.

In some embodiments, in response to a multi-touch 841 and 843 rotation gesture by the user, the web page may be rotated from portrait viewing (UI 800B, FIG. 8B) to landscape viewing (UT 800C, FIG. 8C), even if the amount of rotation in the multi-touch 841 and 843 rotation gesture is substantially different from 90°. Similarly, in response to a multi-touch 845 and 847 rotation gesture by the user, the web page may be rotated back from landscape viewing to portrait viewing, even if the amount of rotation in the multi-touch 845 and 847 rotation gesture is substantially different from 90°.

In some embodiments, multi-touch 841 and 843 rotation is performed by a user performing two substantially simultaneous finger contact rotations on or near the touch screen 112 within the display area occupied by the web page (e.g., on block 814-5).

Thus, in response to imprecise gestures by the user, precise movements of graphics occur. The device behaves in the manner desired by the user despite inaccurate input by the user. Note that the gestures described above for UI 800B, which has a portrait view, are also applicable to UIs with a landscape view (e.g., UI 800C) so that the user can choose whichever view the user prefers for web browsing.

FIG. 8D depicts a UI 800D for adding new windows to an application, such as the browser 147. For example, in response to a user finger tap 848 on the New Window icon 822, UI 800D displays an application (e.g., the browser 147) in a predefined mode, which includes a displayed window (e.g., web page 812-2) and at least one partially hidden window (e.g., web pages 812-1 and 812-3 and possibly other web pages that are completely hidden off-screen). UT 800D also displays an icon for adding windows to the application (e.g., new window or new page icon 836). Upon detecting activation of the icon 836 for adding windows, the browser adds a window to the application (e.g., a new window for a new web page 812).

Upon detecting a gesture on the touch screen display, a displayed window in the application is moved off the display and a hidden window is moved onto the display. For example, in response to detecting a tap gesture 849 on the left side of the screen, the window with web page 812-2 moves partially off-screen to the right to occupy the position left by the window with web page 812-3, which may move completely off-screen. Meanwhile, the partially hidden window with web page 812-1 moves to the center of the display, and another completely hidden window with a web page (not shown) may move partially onto the display. Alternatively, a left-to-right swipe gesture 851 on the touch screen may achieve the same effect.

Conversely, in response to detecting a tap gesture 853 on the right side of the screen, the window with web page 812-2 moves partially to the left and pushes the window with web page 812-1 off the display. Meanwhile, the partially hidden window with web page 812-3 moves to the center of the display, and another completely hidden window with a web page (not shown) may move partially onto the display. Alternatively, a right-to-left swipe gesture 851 may achieve the same effect.

In some embodiments, the tap gestures 849 or 853 may or may not be performed on (or within) the corresponding windows 812-1 or 812-3. The portable device operates in the same manner mentioned above as long as the tap gestures are within a predefined range from the corresponding windows.

In some embodiments, in response to a tap or other predefined gesture on a delete icon 834, the corresponding window 812 is deleted. In some embodiments, after the user-selected window is deleted from the display, a neighboring window moves in from the left or right to occupy the spot used to be occupied by the deleted window. In some embodiments, in response to a tap or other predefined gesture on Done icon 838, the window in the center of the display (e.g., 812-2) is enlarged to fill the screen. The operations described above in connection with UI 800D, which has a landscape view, are also applicable to UIs with a landscape view (e.g., UI 800A) so that the user can choose whichever view the user prefers for web browsing.

Figure 9:
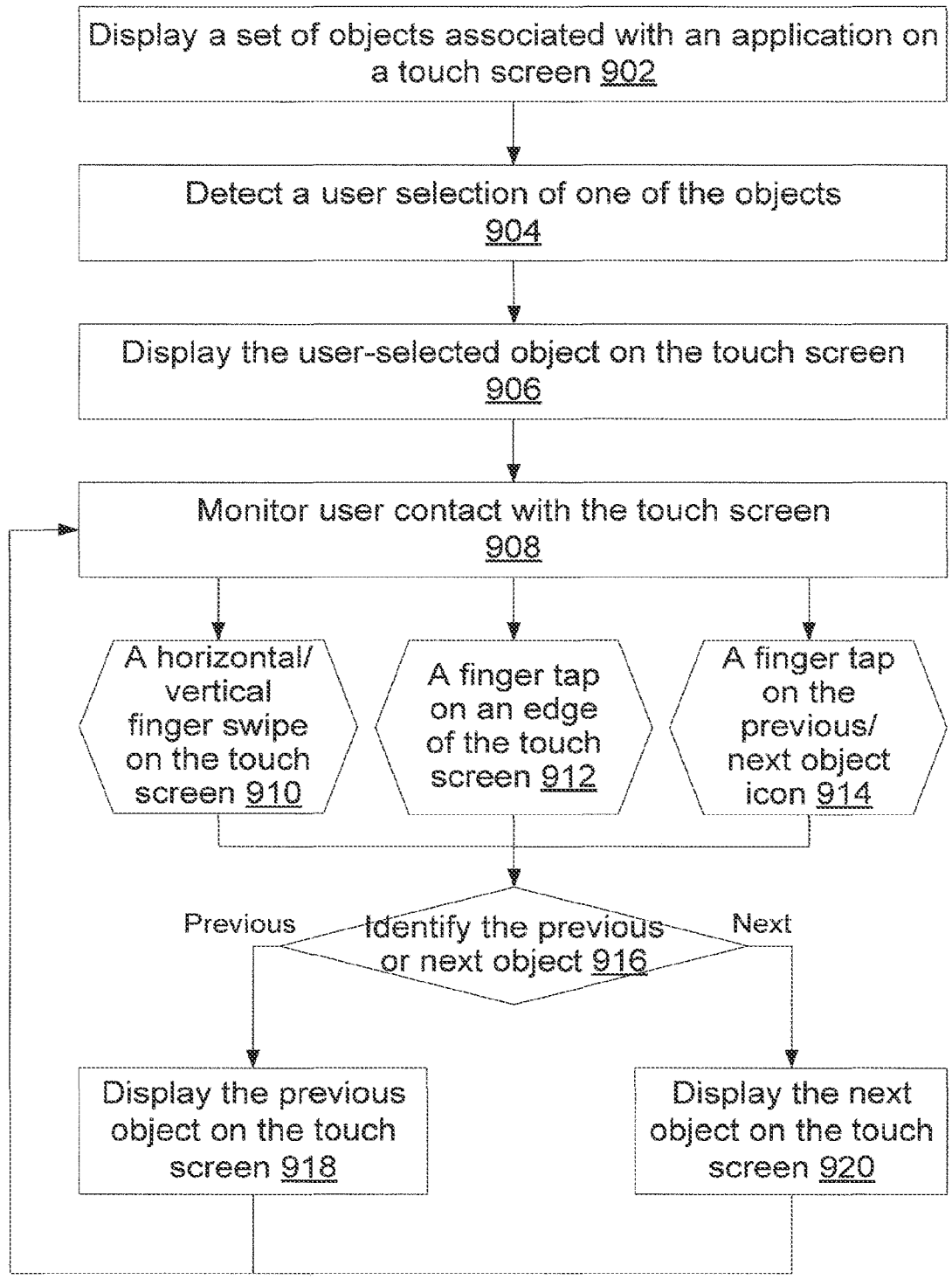
FIG. 9 is a generalized flowchart illustrating a process for performing a predefined operation upon detecting multiple types of user gestures on the portable electronic device's touch screen in accordance with some embodiments.

A comparison between the image management application (e.g., UI 700, FIG. 7) and the browser application (e.g., UI 800D, FIG. 8D) indicates that both applications have the feature of performing the same set of operations in response to different types of user gestures. FIG. 9 is a generalized flowchart illustrating a process for performing a predefined operation upon detecting multiple types of user gestures on the portable electronic device's touch screen in accordance with some embodiments.

Upon a user selection of an icon in an application UI, the device displays a set of objects associated with the application on its touch screen (902). Depending on the application, the set of objects may be a set of thumbnail images (UI 600, FIG. 6), browsing windows, web page blocks, or the like.

Upon detecting a user selection of one of the objects (904), the device displays a specific, user-selected object (e.g., an enlarged image) on the touch screen (906) and then starts monitoring user gestures on the touch screen (908).

If the user gesture is a horizontal/vertical finger swipe on the touch screen (910), a finger tap on an edge of the touch screen (912), or a finger tap on the previous/next object icon (914), the device identifies in the set the previous or next object that is chosen by the user (916) and displays the previous or next object on the touch screen in replacement of the current object on the display (918, 920).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a touch screen display;
one or more processors;
memory; and
one or more programs, wherein the one or more programs are stored in the memory and configured to be executed by the one or more processors, the one or more programs including instructions for:
displaying a user interface on the touch screen display, wherein the user interface includes:
at least portions of two windows of an application, including a first window and a second window; and
an icon at a location different from the at least two windows of the application;
while displaying the at least two windows, detecting a first gesture on the first window on the touch screen display;
in response to detecting the first gesture on the first window, removing the first window from the touch screen display;
while displaying the second window, detecting a second gesture on the icon at the location different from the at least two windows of the application; and
in response to detecting the second gesture on the icon at the location different from the at least two windows of the application, enlarging the second window on the touch screen display.

2. The electronic device of claim 1, wherein the first gesture is a tap gesture.

3. The electronic device of claim 1, wherein the second gesture is a tap gesture.

4. The electronic device of claim 1, wherein:
the first window is located at a first location; and
removing the first window from the touch screen display includes displaying an animation of the second window moving to the first location.

5. The electronic device of claim 4, wherein:
after the second window is moved to the first location, the user interface includes a third window at a second location, different from the first location; and
enlarging the second window on the touch screen display includes ceasing to display the third window.

6. A non-transitory computer-readable storage medium storing one or more programs configured to be executed by one or more processors of an electronic device with a touch screen display, the one or more programs including instructions for:
displaying a user interface on the touch screen display, wherein the user interface includes:
at least portions of two windows of an application, including a first window and a second window; and
an icon at a location different from the at least two windows of the application;
while displaying the at least two windows, detecting a first gesture on the first window on the touch screen display;
in response to detecting the first gesture on the first window, removing the first window from the touch screen display;
while displaying the second window, detecting a second gesture on the icon at the location different from the at least two windows of the application; and
in response to detecting the second gesture on the icon at the location different from the at least two windows of the application, enlarging the second window on the touch screen display.

7. A method, comprising:
at an electronic device with a touch screen display:
displaying a user interface on the touch screen display, wherein the user interface includes:
at least portions of two windows of an application, including a first window and a second window; and
an icon at a location different from the at least two windows of the application;
while displaying the at least two windows, detecting a first gesture on the first window on the touch screen display;

in response to detecting the first gesture on the first window, removing the first window from the touch screen display;

while displaying the second window, detecting a second gesture on the icon at the location different from the at least two windows of the application; and in response to detecting the second gesture on the icon at the location different from the at least two windows of the application, enlarging the second window on the touch screen display.

8. The non-transitory computer-readable storage medium of claim 6, wherein the first gesture is a tap gesture.

9. The non-transitory computer-readable storage medium of claim 6, wherein the second gesture is a tap gesture.

10. The non-transitory computer-readable storage medium of claim 6, wherein:
the first window is located at a first location; and
removing the first window from the touch screen display includes displaying an animation of the second window moving to the first location.

11. The non-transitory computer-readable storage medium of claim 10, wherein:
after the second window is moved to the first location, the user interface includes a third window at a second location, different from the first location; and
enlarging the second window on the touch screen display includes ceasing to display the third window.

12. The method of claim 7, wherein the first gesture is a tap gesture.

13. The method of claim 7, wherein the second gesture is a tap gesture.

14. The method of claim 7, wherein:
the first window is located at a first location; and
removing the first window from the touch screen display includes displaying an animation of the second window moving to the first location.

15. The method of claim 14, wherein:
after the second window is moved to the first location, the user interface includes a third window at a second location, different from the first location; and
enlarging the second window on the touch screen display includes ceasing to display the third window.

* * * * *